United States Patent
Baecker et al.

(10) Patent No.: US 9,919,479 B2
(45) Date of Patent: *Mar. 20, 2018

(54) REGISTRATION AND OVERLAY ERROR CORRECTION OF ELECTROPHOTOGRAPHICALLY FORMED ELEMENTS IN AN ADDITIVE MANUFACTURING SYSTEM

(71) Applicant: Stratasys, Inc., Eden Prairie, MN (US)

(72) Inventors: James Baecker, Chanhassen, MN (US); J. Samuel Batchelder, Somers, NY (US)

(73) Assignee: Stratasys, Inc., Eden Prairie, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/230,809

(22) Filed: Aug. 8, 2016

(65) Prior Publication Data

US 2016/0339646 A1    Nov. 24, 2016

Related U.S. Application Data

(63) Continuation-in-part of application No. 14/242,364, filed on Apr. 1, 2014, now Pat. No. 9,688,027.

(51) Int. Cl.
*B29C 67/00* (2017.01)
*B33Y 10/00* (2015.01)
(Continued)

(52) U.S. Cl.
CPC ...... *B29C 67/0088* (2013.01); *B29C 67/0074* (2013.01); *B33Y 10/00* (2014.12);
(Continued)

(58) Field of Classification Search
CPC ............ B29C 67/0051; B29C 67/0066; B29C 67/0085; B29C 67/0088; G03G 15/224; B33Y 10/00; B33Y 30/00; B33Y 50/02
(Continued)

(56) References Cited

U.S. PATENT DOCUMENTS 2,297,691 A    4/1939    Carlson
4,988,602 A    1/1991    Jongewaard et al.
(Continued)

FOREIGN PATENT DOCUMENTS

CN    101310964 A    11/2008
EP    0712051 A2    5/1996
(Continued)

OTHER PUBLICATIONS

International Search Report and Written Opinion dated Jul. 20, 2015 for corresponding International Application No. PCT/US2015/017988, filed Feb. 27, 2015.
(Continued)

*Primary Examiner* — George Koch
(74) *Attorney, Agent, or Firm* — Peter J. Ims; Westman, Champlin & Koehler, P.A.

(57) ABSTRACT

In a method for printing a three-dimensional (3D) parts with an additive manufacturing system, a developed layer of an electrically charged powder material is produced on a transfer medium using an electrophotographic (EP) engine. The transfer medium and the developed layer are fed in a feed direction. A position of the developed layer on the transfer medium is detected using a first sensor having a first output that indicates the position. A position of a moveable build platform is adjusted relative to the transfer medium to reduce one or more overlay errors between the developed layer and an intermediate build surface of a three-dimensional structure retained on the moveable build platform based on the first output. The developed layer is transferred to the intermediate build surface using a pressing element.

12 Claims, 11 Drawing Sheets

(51) Int. Cl.
*B33Y 50/02* (2015.01)
*G03G 15/22* (2006.01)
*B33Y 30/00* (2015.01)
*B33Y 40/00* (2015.01)
*B29K 105/00* (2006.01)

(52) U.S. Cl.
CPC ............ *B33Y 50/02* (2014.12); *G03G 15/224* (2013.01); *B29K 2105/251* (2013.01); *B33Y 30/00* (2014.12); *B33Y 40/00* (2014.12)

(58) Field of Classification Search
USPC .......................................... 156/367; 425/140
See application file for complete search history.

(56) References Cited

U.S. PATENT DOCUMENTS

| | | |
|---|---|---|
| 5,088,047 A | 2/1992 | Bynum |
| 5,099,288 A | 3/1992 | Britto et al. |
| 5,254,421 A | 10/1993 | Coppens et al. |
| 5,354,414 A | 10/1994 | Feygin |
| 5,354,799 A | 10/1994 | Bennett et al. |
| 5,514,232 A | 5/1996 | Burns |
| 5,592,266 A | 1/1997 | Park et al. |
| 5,593,531 A | 1/1997 | Penn |
| 5,594,652 A | 1/1997 | Penn et al. |
| 5,866,058 A | 2/1999 | Batchelder et al. |
| 5,981,616 A | 11/1999 | Yamamura et al. |
| 5,990,268 A | 11/1999 | Dickens, Jr. et al. |
| 6,052,551 A | 4/2000 | De Cock et al. |
| 6,066,285 A | 5/2000 | Kumar |
| 6,169,605 B1 | 1/2001 | Penn et al. |
| 6,206,672 B1 | 3/2001 | Grenda |
| 6,329,115 B1 | 12/2001 | Yamashita |
| 6,376,148 B1 | 4/2002 | Liu et al. |
| 6,492,651 B2 | 12/2002 | Kerekes |
| 6,509,128 B1 | 1/2003 | Everaerts et al. |
| 6,531,086 B1 | 3/2003 | Larsson |
| 6,780,368 B2 | 8/2004 | Liu et al. |
| 6,799,959 B1 | 10/2004 | Tochimoto et al. |
| 6,815,636 B2 | 11/2004 | Chung et al. |
| 6,887,640 B2 | 5/2005 | Zhang et al. |
| 7,011,783 B2 | 3/2006 | Fong |
| 7,077,638 B2 | 7/2006 | Leyden et al. |
| 7,208,257 B2 | 4/2007 | Cheng et al. |
| 7,261,541 B2 | 8/2007 | Fong |
| 7,261,542 B2 | 8/2007 | Hickerson et al. |
| 7,291,242 B2 | 11/2007 | Khoshnevis |
| 7,435,763 B2 | 10/2008 | Farr et al. |
| 7,815,826 B2 | 10/2010 | Serdy et al. |
| 7,988,906 B2 | 8/2011 | Monsheimer et al. |
| 8,047,251 B2 | 11/2011 | Khoshnevis |
| 8,119,053 B1 | 2/2012 | Bedal et al. |
| 8,123,999 B2 | 2/2012 | Priedeman, Jr. et al. |
| 8,124,192 B2 | 2/2012 | Paasche et al. |
| 8,147,910 B2 | 4/2012 | Kritchman |
| 8,173,258 B2 | 5/2012 | Monsheimer et al. |
| 8,216,757 B2 | 7/2012 | Mizutani et al. |
| 8,221,671 B2 | 7/2012 | Hull et al. |
| 8,246,888 B2 | 8/2012 | Hopkins et al. |
| 8,249,480 B2 | 8/2012 | Aslam et al. |
| 8,459,280 B2 | 6/2013 | Swanson et al. |
| 8,488,994 B2 | 7/2013 | Hanson et al. |
| 8,879,957 B2 | 11/2014 | Hanson et al. |
| 2002/0093115 A1 | 7/2002 | Jang et al. |
| 2002/0145213 A1 | 10/2002 | Liu et al. |
| 2003/0087176 A1 | 5/2003 | Ezenyilimba et al. |
| 2004/0173946 A1 | 9/2004 | Pfeifer et al. |
| 2004/0232583 A1 | 11/2004 | Monsheimer et al. |
| 2005/0207801 A1 | 9/2005 | Kunii et al. |
| 2005/0218549 A1 | 10/2005 | Farr et al. |
| 2008/0032083 A1 | 2/2008 | Serdy et al. |
| 2008/0169585 A1 | 7/2008 | Zinniel |
| 2008/0169589 A1 | 7/2008 | Sperry et al. |
| 2008/0171284 A1 | 7/2008 | Hull et al. |
| 2008/0226346 A1 | 9/2008 | Hull et al. |
| 2009/0236775 A1 | 9/2009 | Monsheimer et al. |
| 2011/0117485 A1 | 5/2011 | Hermann et al. |
| 2011/0186081 A1 | 8/2011 | Dunn et al. |
| 2011/0190446 A1 | 8/2011 | Matsui et al. |
| 2012/0041132 A1 | 2/2012 | Monsheimer et al. |
| 2012/0139167 A1 | 6/2012 | Fruth et al. |
| 2012/0154773 A1* | 6/2012 | Beyer ................ G03F 1/72 355/52 |
| 2012/0201960 A1 | 8/2012 | Hartmann et al. |
| 2012/0202012 A1 | 8/2012 | Grebe et al. |
| 2012/0237870 A1 | 9/2012 | Watanabe et al. |
| 2012/0263488 A1 | 10/2012 | Ashlam et al. |
| 2012/0274002 A1 | 11/2012 | Uchida |
| 2013/0075033 A1* | 3/2013 | Chillscyzn ........ B29C 67/0074 156/277 |
| 2013/0077996 A1 | 3/2013 | Hanson et al. |
| 2013/0077997 A1 | 3/2013 | Hanson et al. |
| 2013/0171434 A1 | 7/2013 | Hirth et al. |
| 2013/0186549 A1 | 7/2013 | Comb et al. |
| 2013/0186558 A1 | 7/2013 | Comb et al. |
| 2014/0004462 A1 | 1/2014 | Zaretsky |
| 2014/0167326 A1 | 6/2014 | Jones et al. |
| 2015/0266242 A1 | 9/2015 | Comb et al. |

FOREIGN PATENT DOCUMENTS

| | | |
|---|---|---|
| GB | 2446386 A | 8/2008 |
| JP | 5165350 A | 7/1993 |
| JP | 8281808 A | 10/1996 |
| JP | 2001075376 A | 3/2001 |
| JP | 2002347129 A | 12/2002 |
| JP | 2003053849 A | 2/2003 |
| JP | 2003071940 A | 3/2003 |
| JP | 2005062860 A | 3/2005 |
| JP | 2006182813 A | 7/2006 |
| WO | 9851464 A1 | 11/1998 |
| WO | 2007114895 A2 | 10/2007 |
| WO | 2011065920 A1 | 6/2011 |
| WO | 2012034666 A1 | 3/2012 |

OTHER PUBLICATIONS

"Xerography", Aug. 27, 2010, pp. 1-4, http:/en.wikipedia.org/wiki/Xerography.

Jones, Jason, "Selective Laser Printing", Published Prior to Jan. 14, 2013, 1 page.

* cited by examiner

REGISTRATION AND OVERLAY ERROR CORRECTION OF ELECTROPHOTOGRAPHICALLY FORMED ELEMENTS IN AN ADDITIVE MANUFACTURING SYSTEM

CROSS-REFERENCE TO RELATED APPLICATION

This application is a continuation-in-part of U.S. application Ser. No. 14/242,364, filed Apr. 1, 2014 now U.S. Pat. No. 9,688,027. The above-referenced application is incorporated herein by reference in its entirety.

BACKGROUND

The present disclosure relates to systems and methods for additive manufacturing of three-dimensional (3D) parts, and more particularly, to additive manufacturing systems and processes for building 3D parts and their support structures.

Additive manufacturing systems are used to build 3D parts from digital representations of the 3D parts (e.g., AMF and STL format files) using one or more additive manufacturing techniques. Examples of commercially available additive manufacturing techniques include extrusion-based techniques, ink jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to form the given layer.

For example, in an extrusion-based additive manufacturing system, a 3D part or model may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed, and in some cases, for the sidewalls of the 3D part being formed. The support material adheres to the part material during fabrication, and is removable from the completed 3D part when the printing process is complete.

In an electrophotographic 3D printing process, each slice of the digital representation of the 3D part and its support structure is printed or developed using an electrophotographic engine. The electrophotographic engine generally operates in accordance with 2D electrophotographic printing processes, using charged powder materials that are formulated for use in building a 3D part (e.g., a polymeric toner material). The electrophotographic engine typically uses a support drum that is coated with a photoconductive material layer, where latent electrostatic images are formed by electrostatic charging following image-wise exposure of the photoconductive layer by an optical source. The latent electrostatic images are then moved to a developing station where the polymeric toner is applied to charged areas, or alternatively to discharged areas of the photoconductive insulator to form the layer of the charged powder material representing a slice of the 3D part. The developed layer is transferred to a transfer medium, from which the layer is transfused to previously printed layers with heat and/or pressure to build the 3D part.

SUMMARY

Aspects of the present disclosure are directed to methods for printing a three-dimensional (3D) parts with an additive manufacturing system, and an additive manufacturing system. In some embodiments of the method, a developed layer of an electrically charged powder material is produced on a transfer medium using an electrophotographic (EP) engine. The transfer medium and the developed layer are fed in a feed direction. A position of the developed layer on the transfer medium is detected using a first sensor having a first output that indicates the position. A position of a moveable build platform is adjusted relative to the transfer medium to reduce one or more overlay errors between the developed layer and an intermediate build surface of a three-dimensional structure retained on the moveable build platform based on the first output. The developed layer is transferred to the intermediate build surface using a pressing element.

Some embodiments of the system include an electrophotographic (EP) engine, a transfer medium, a build platform, one or more gantry mechanisms configured to move the build platform, a pressing element, a first sensor and a controller. The EP engine is configured to develop layers of a first electrically charged powder material. The transfer medium is configured to receive the developed layers from the EP engine. The pressing element is configured to press the developed layers into contact with intermediate build surfaces of a three-dimensional structure on the build platform. The first sensor includes a first output indicating a detected position of a developed layer on the transfer medium. The controller is configured to reduce adjust the one or more gantry mechanisms to compensate for one or more overlay errors between the developed layer and the intermediate build surfaces, using the first output.

Other aspects of the present disclosure are directed to a method for printing a 3D part and support structure with an additive manufacturing system.

Definitions

Unless otherwise specified, the following terms as used herein have the meanings provided below:

The term "copolymer" refers to a polymer having two or more monomer species, and includes terpolymers (i.e., copolymers having three monomer species).

The terms "at least one" and "one or more of" an element are used interchangeably, and have the same meaning that includes a single element and a plurality of the elements, and may also be represented by the suffix "(s)" at the end of the element. For example, "at least one polyimide", "one or more polyamides", and "polyamide(s)" may be used interchangeably and have the same meaning.

The terms "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

DETAILED DESCRIPTION

Figure 1:
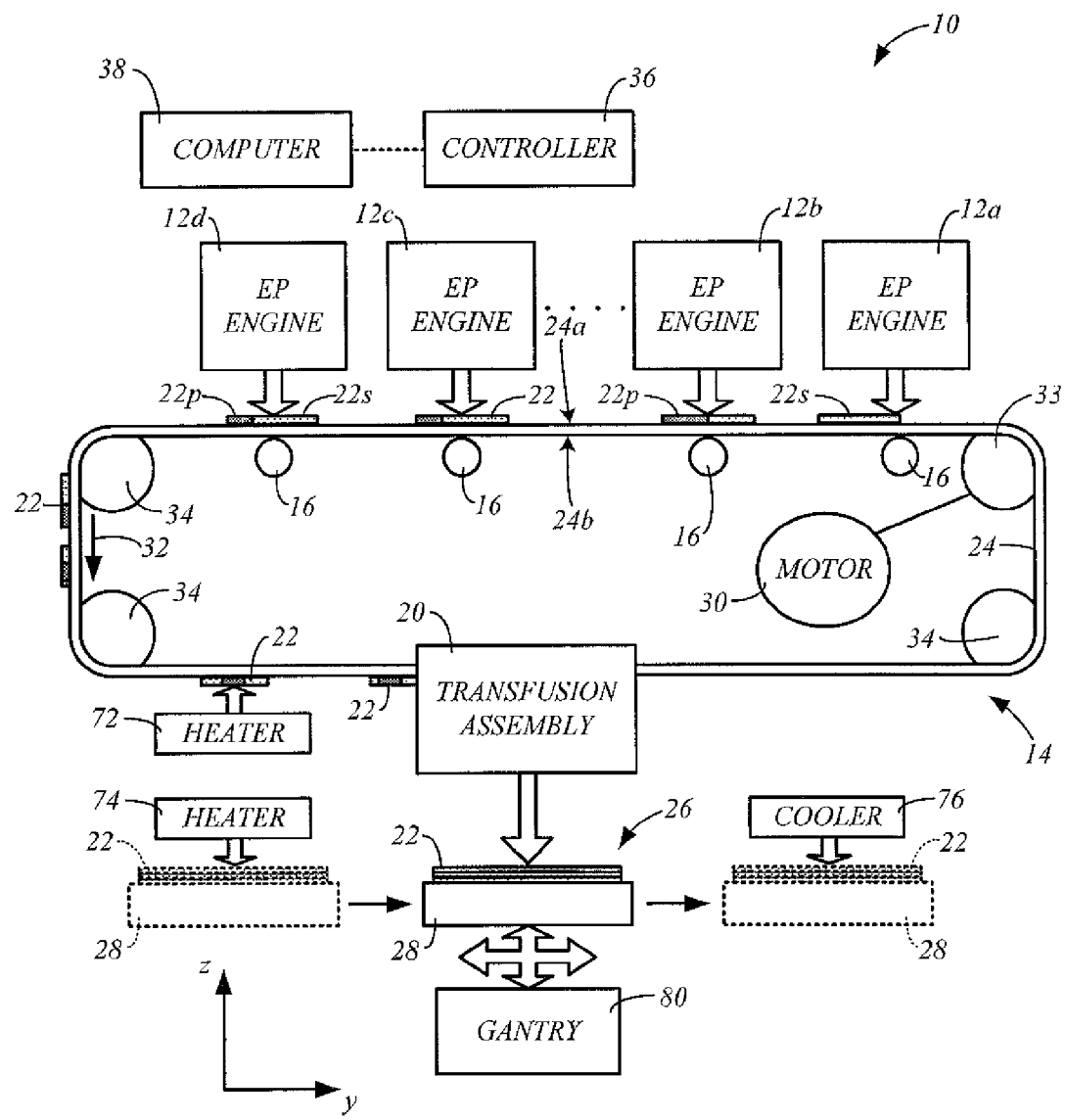
FIG. 1 is a simplified diagram of an exemplary electrophotography-based additive manufacturing system for printing 3D parts and associated support structures, in accordance with embodiments of the present disclosure.

Embodiments of the disclosure are described more fully hereinafter with reference to the accompanying drawings. Elements that are identified using the same or similar reference characters refer to the same or similar elements. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

As will further be appreciated by one of skill in the art, the present disclosure may be embodied as methods, systems, devices, and/or computer program products, for example. Accordingly, the present disclosure may take the form of an entirely hardware embodiment, an entirely software embodiment or an embodiment combining software and hardware aspects. The computer program or software aspect of the present disclosure may comprise computer readable instructions or code stored in a computer readable medium or memory. Execution of the program instructions by one or more processors (e.g., central processing unit), such as one or more processors of a controller, results in the one or more processors performing one or more functions or method steps described herein. Any suitable patent subject matter eligible computer-readable media or memory may be utilized including, for example, hard disks, CD-ROMs, optical storage devices, or magnetic storage devices. Such computer-readable media or memory do not include transitory waves or signals.

The computer-readable medium or memory mentioned herein, may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random axis memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As mentioned above, during an electrophotographic 3D part additive manufacturing or printing operation, electrophotographic (EP) engines develop each layer of a 3D part out of charged particle materials (e.g., polymeric toners) using the electrophotographic process. A completed layer of the 3D part typically includes a part portion formed of part material by one EP engine that is transferred to a suitable transfer medium, such as a transfer belt or drum, and a support structure portion formed of support material by a different EP engine that is applied to the transfer medium in registration with the corresponding part portion. Alternatively, the part portion may be developed and transferred to the transfer medium in registration with a previously printed support structure portion on the transfer medium. The completed layers of the 3D part are delivered to a transfusion assembly using the transfer medium where the layers are transfused together (e.g., using heat and/or pressure) in an overlaying manner to build the 3D part and support structures in a layer-by-layer manner. The support structures are later dissolved or disintegrated in an aqueous solution or dispersion to reveal the completed 3D part.

The accuracy at which a 3D part may be produced using an electrophotography-based additive manufacturing system is limited by registration errors between the EP engines, and overlay errors at the transfusion assembly. Registration errors relate to the accuracy at which the layers of materials are printed relative to each other on the transfer medium by the EP engines. Overlay errors relate to the accuracy at which a printed layer is transfused to a layer of the currently formed 3D part and support structure in proper alignment. Registration and overlay errors can prevent the part and support materials from being printed at precisely the correct locations or within a margin of error in the x-y build plane, which can reduce printing accuracies, particularly for fine-feature details. Additionally, in some situations, these errors can result in the formation of overhanging ridges in the 3D part, which can grow along the z-axis to impair part accuracies and even impact the system performance if left uncorrected. Additionally, edge positioning errors can induce crack-like surface features which substantially reduce the effective bulk strength of the fabricated parts.

Embodiments of the present disclosure are directed to an electrophotography-based additive manufacturing system and method for controlling such registration and/or overlay errors to thereby improve the accuracy at which a 3D part may be formed. Some embodiments, the system and method of the present disclosure utilize one or more sensors to determine registration and/or overlay errors, and to correct or compensate for the errors. In some embodiments, upstream x-y registration errors occurring at the EP engines are corrected by feedforward compensations using the at least one sensor and a controller of the system. In some embodiments, downstream x-y overlay errors occurring during transfusion of the developed layers on the transfer medium to the top layer of the 3D part and support structure are corrected by feedback compensations using the at least one sensor and the controller of the system. In some embodiments, the feedback compensations are used to adjust the relative x-y positions of the current 3D part and support structure and the transfer medium supporting layers to be transfused to the 3D part and support structure.

In some embodiments, the one or more sensors include at least one sensor for detecting developed layers on the transfer medium before they undergo the transfusion process, at least one sensor for detecting portions of developed layers that remain on the transfer medium after the transfusion process, and/or at least one sensor for detecting misalignment between the top layers of the 3D part and support structure during its formation. In some embodiments, the controller of the system compares position information obtained using the one or more sensors to set points, to detect overlay and registration errors and perform necessary feedback and/or feedforward compensations.

FIG. 1 is a simplified diagram of an exemplary electrophotography-based additive manufacturing system 10 for printing 3D parts and associated support structures, in accordance with embodiments of the present disclosure. As shown in FIG. 1, system 10 includes one or more electrophotographic (EP) engines, generally referred to as 12, such as EP engines 12a-d, a transfer assembly 14, biasing mechanism 16, and a transfusion assembly 20. Examples of suitable components and functional operations for system 10 include those disclosed in Hanson et al., U.S. Pat. Nos. 8,879,957 and 8,488,994, and in Comb et al., U.S. Publication Nos. 2013/0186549 and 2013/0186558.

The EP engines 12 are imaging engines for respectively imaging or otherwise developing completed layers of the 3D part, which are generally referred to as 22, of the charged powder part and support materials. The charged powder part and support materials are each preferably engineered for use with the particular architecture of the EP engines 12. In some embodiments, at least one of the EP engines 12 of the system 10, such as EP engines 12a and 12c, develops layers of the support material to form the support structure portions 22s of a layer 22, and at least one of the EP engines 12, such as EP engines 12b and 12d, develops layers of the part material to form the part portions 22p of the layer 22. The EP engines 12 transfer the formed part portions 22p and the support structure portions 22s to a transfer medium, such as a transfer belt 24, which is shown in FIG. 1. Embodiments of the present disclosure include the use of other suitable transfer mediums in place of, or in addition to, the transfer belt 24, such as a transfer drum. Accordingly, embodiments of the present disclosure are not limited to the use of transfer mediums in the form of the transfer belt 24.

In some embodiments, the system 10 includes at least one pair of the EP engines 12, such as EP engines 12a and 12b, which cooperate to form completed layers 22. In some embodiments, additional pairs of the EP engines 12, such as EP engines 12c and 12d, may cooperate to form other layers 22.

In some embodiments, each of the EP engines 12 that is configured to form the support structure portion 22s of a given layer 22 is positioned upstream from a corresponding EP engine 12 that is configured to form the part portion 22p of the layer 22 relative to the feed direction 32 of the transfer belt 24. Thus, for example, EP engines 12a and 12c that are each configured to form the support structure portions 22s are positioned upstream from their corresponding EP engines 12b and 12d that are configured to form the part portions 22p relative to the feed direction 32 of the transfer belt 24, as shown in FIG. 1. In alternative embodiments, this arrangement of the EP engines 12 may be reversed such that the EP engines that form the part portions 22p may be located upstream from the corresponding EP engines 12 that are configured to form the support structure portions 22s relative to the feed direction 32 of the transfer belt 24. Thus, for example, the EP engine 12b may be positioned upstream from the EP engine 12a and the EP engine 12d may be positioned upstream of the EP engine 12c relative to the feed direction 32 of the transfer belt 24.

As discussed below, the developed layers 22 are transferred to a transfer medium 24 of the transfer assembly 14, which delivers the layers 22 to the transfusion assembly 20. The transfusion assembly 20 operates to build a structure 26, which includes the 3D part 26p, support structures 26s and/or other features, in a layer-by-layer manner by transfusing the layers 22 together on a build platform 28.

In some embodiments, the transfer medium 24 includes a belt, as shown in FIG. 1. Examples of suitable transfer belts for the transfer medium 24 include those disclosed in Comb et al. (U.S. Publication Nos. 2013/0186549 and 2013/0186558). In some embodiments, the belt 24 includes front surface 24a and rear surface 24b, where front surface 24a faces the EP engines 12, and the rear surface 24b is in contact with the biasing mechanisms 16.

In some embodiments, the transfer assembly 14 includes one or more drive mechanisms that include, for example, a motor 30 and a drive roller 33, or other suitable drive mechanism, and operate to drive the transfer medium or belt 24 in a feed direction 32. In some embodiments, the transfer assembly 14 includes idler rollers 34 that provide support for the belt 24. The exemplary transfer assembly 14 illustrated in FIG. 1 is highly simplified and may take on other configurations. Additionally, the transfer assembly 14 may include additional components that are not shown in order to simplify the illustration, such as, for example, components for maintaining a desired tension in the belt 24, a belt cleaner for removing debris from the surface 24a that receives the layers 22, and other components.

System 10 also includes a controller 36, which represents one or more processors that are configured to execute instructions, which may be stored locally in memory of the system 10 or in memory that is remote to the system 10 to control components of the system 10 to perform one or more functions described herein. In some embodiments, the processors of the controller 36 are components of one or more computer-based systems. In some embodiments, the controller 36 includes one or more control circuits, microprocessor-based engine control systems, one or more programmable hardware components, such as a field programmable gate array (FPGA), and/or digitally-controlled raster imaging processor systems that are used to control components of the system 10 to perform one or more functions described herein. In some embodiments, the controller 36 controls components of the system 10 in a synchronized manner based on printing instructions received from a host computer 38 or a remote location, for example.

In some embodiments, the controller 36 communicates over suitable wired or wireless communication links with the components of the system 10. In some embodiments, the controller 36 communicates over a suitable wired or wireless communication link with external devices, such as the host computer 38 or other computers and servers, such as over a network connection (e.g., local area network (LAN) connection), for example.

In some embodiments, the host computer 38 includes one or more computer-based systems that are configured to communicate with the controller 36 to provide the print instructions (and other operating information). For example, the host computer 38 may transfer information to the controller 36 that relates to the sliced layers of the 3D parts and support structures, thereby allowing the system 10 to print the layers 22 and form the 3D part including any support structures in a layer-by-layer manner. As discussed in greater detail below, in some embodiments, the controller 36 also uses signals from one or more sensors to assist in properly registering the printing of the part portion 22p and/or the support structure portion 22s with a previously printed corresponding support structure portion 22s or part portion 22p on the belt 24 to form the individual layers 22.

The components of system 10 may be retained by one or more frame structures. Additionally, the components of system 10 may be retained within an enclosable housing that prevents components of the system 10 from being exposed to ambient light during operation.

Figure 2:
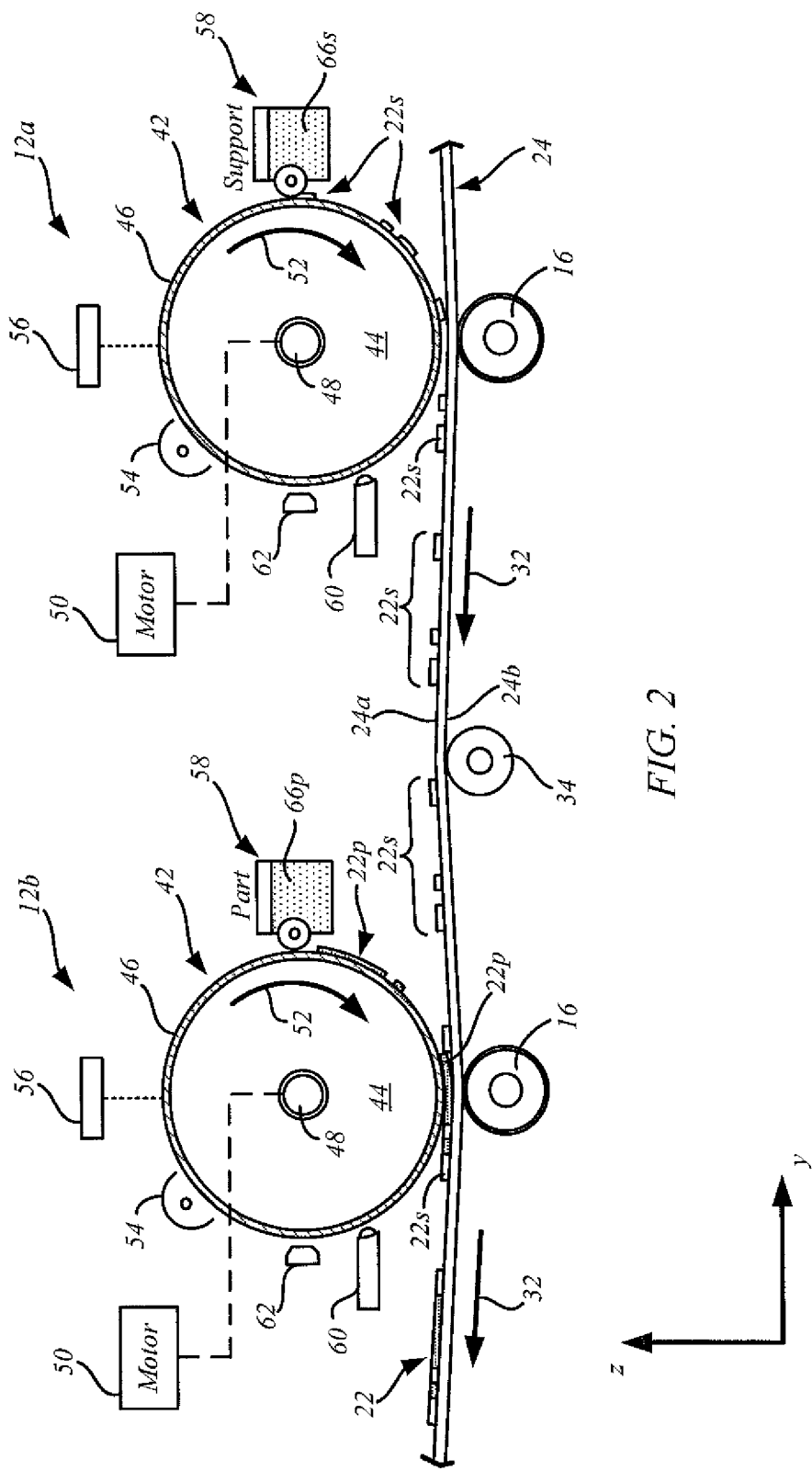
FIG. 2 is a schematic front view of electrophotographic engines, in accordance with exemplary embodiments of the present disclosure.

FIG. 2 is a schematic front view of the EP engines 12a and 12b of the system 10, in accordance with exemplary embodiments of the present disclosure. In the shown embodiment, the EP engines 12a and 12b may include the same components, such as a photoconductor drum 42 having a conductive body 44 and a photoconductive surface 46. The conductive body 44 is an electrically-conductive body (e.g., fabricated from copper, aluminum, tin, or the like), that is electrically grounded and configured to rotate around a shaft 48. The shaft 48 is correspondingly connected to a drive motor 50, which is configured to rotate the shaft 48 (and the photoconductor drum 42) in the direction of arrow 52 at a constant rate. While embodiments of the EP engines 12 are discussed and illustrated as utilizing a photoconductor drum 42, a belt having a conductive material, or other suitable bodies, may also be utilized in place of the photoconductor drum 42 and the conductive body 44.

The photoconductive surface 46 is a thin film extending around the circumferential surface of the conductive body 44 (shown as a drum but can alternatively be a belt or other suitable body), and is preferably derived from one or more photoconductive materials, such as amorphous silicon, selenium, zinc oxide, organic materials, and the like. As discussed below, the surface 46 is configured to receive latent-charged images of the sliced layers of a 3D part or support structure (or negative images), and to attract charged particles of the part or support material to the charged or discharged image areas, thereby creating the layers 22 of the 3D part 26p or support structure 26s.

As further shown, each of the exemplary EP engines 12a and 12b also includes a charge inducer 54, an imager 56, a development station 58, a cleaning station 60, and a discharge device 62, each of which may be in signal communication with the controller 36. The charge inducer 54, the imager 56, the development station 58, the cleaning station 60, and the discharge device 62 accordingly define an image-forming assembly for the surface 46 while the drive motor 50 and the shaft 48 rotate the photoconductor drum 42 in the direction 52.

The EP engines 12 use the charged particle material (e.g., polymeric or thermoplastic toner), generally referred to herein as 66, to develop or form the layers 22. In some embodiments, the image-forming assembly for the surface 46 of the EP engine 12a is used to form support structure portions 22s of the support material 66s, where a supply of the support material 66s may be retained by the development station 58 (of the EP engine 12a) along with carrier particles. Similarly, the image-forming assembly for the surface 46 of the EP engine 12b is used to form part portions 22p of the part material 66p, where a supply of the part material 66p may be retained by the development station 58 (of the EP engine 12b) along with carrier particles.

The charge inducer 54 is configured to generate a uniform electrostatic charge on the surface 46 as the surface 46 rotates in the direction 52 past the charge inducer 54. Suitable devices for the charge inducer 54 include corotrons, scorotrons, charging rollers, and other electrostatic charging devices.

The imager 56 is a digitally-controlled, pixel-wise light exposure apparatus configured to selectively emit electromagnetic radiation toward the uniform electrostatic charge on the surface 46 as the surface 46 rotates in the direction 52 past the imager 56. The selective exposure of the electromagnetic radiation to the surface 46 is directed by the controller 36, and causes discrete pixel-wise locations of the electrostatic charge to be removed (i.e., discharged), thereby forming latent image charge patterns on the surface 46.

Suitable devices for the imager 56 include scanning laser (e.g., gas or solid state lasers) light sources, light emitting diode (LED) array exposure devices, and other exposure devices conventionally used in 2D electrophotography systems. In alternative embodiments, suitable devices for the charge inducer 54 and the imager 56 include ion-deposition systems configured to selectively directly deposit charged ions or electrons to the surface 46 to form the latent image charge pattern. As such, as used herein, the term "electrophotography" can broadly be considered as "electrostatography," or a process that produces a charge pattern on a surface. Alternatives also include such things as ionography.

Each development station 58 is an electrostatic and magnetic development station or cartridge that retains the supply of the part material 66p or the support material 66s, along with carrier particles. The development stations 58 may function in a similar manner to single or dual component development systems and toner cartridges used in 2D electrophotography systems. For example, each development station 58 may include an enclosure for retaining the part material 66p or the support material 66s and carrier particles. When agitated, the carrier particles generate triboelectric charges to attract the powders of the part material 66p or the support material 66s, which charges the attracted powders to a desired sign and magnitude, as discussed below.

Each development station 58 may also include one or more devices for transferring the charged part or the support material 66p or 66s to the surface 46, such as conveyors, fur brushes, paddle wheels, rollers, and/or magnetic brushes. For instance, as the surface 46 (containing the latent charged image) rotates from the imager 56 to the development station 58 in the direction 52, the charged part material 66p or the support material 66s is attracted to the appropriately charged regions of the latent image on the surface 46, utilizing either charged area development or discharged area development (depending on the electrophotography mode being utilized). This creates successive layers 22p or 22s as the photoconductor drum 42 continues to rotate in the direction 52, where the successive layers 22p or 22s correspond to the successive sliced layers of the digital representation of the 3D part or support structure.

The successive layers 22p or 22s are then rotated with the surface 46 in the direction 52 to a transfer region in which layers 22p or 22s are successively transferred from the photoconductor drum 42 to the belt 24 or other transfer medium, as discussed below. While illustrated as a direct engagement between the photoconductor drum 42 and the belt 24, in some preferred embodiments, the EP engines 12a and 12b may also include intermediary transfer drums and/or belts, as discussed further below.

After a given layer 22p or 22s is transferred from the photoconductor drum 42 to the belt 24 (or an intermediary transfer drum or belt), the drive motor 50 and the shaft 48 continue to rotate the photoconductor drum 42 in the direction 52 such that the region of the surface 46 that previously held the layer 22p or 22s passes the cleaning station 60. The cleaning station 60 is a station configured to remove any residual, non-transferred portions of part or support material 66p or 66s. Suitable devices for the cleaning station 60 include blade cleaners, brush cleaners, electrostatic cleaners, vacuum-based cleaners, and combinations thereof.

After passing the cleaning station 60, the surface 46 continues to rotate in the direction 52 such that the cleaned regions of the surface 46 pass the discharge device 62 to remove any residual electrostatic charge on the surface 46, prior to starting the next cycle. Suitable devices for the discharge device 62 include optical systems, high-voltage alternating-current corotrons and/or scorotrons, one or more rotating dielectric rollers having conductive cores with applied high-voltage alternating-current, and combinations thereof.

The biasing mechanisms 16 are configured to induce electrical potentials through the belt 24 to electrostatically attract the layers 22s and 22p from the EP engines 12a and 12b to the belt 24. Because the layers 22s and 22p are each only a single layer increment in thickness at this point in the process, electrostatic attraction is suitable for transferring the layers 22s and 22p from the EP engines 12a and 12b to the belt 24.

The controller 36 preferably controls the rotation of the photoconductor drums 42 of the EP engines 12a and 12b at the same rotational rates that are synchronized with the line speed of the belt 24 and/or with any intermediary transfer drums or belts. This allows the system 10 to develop and transfer the layers 22s and 22p in coordination with each other from separate developer images. In particular, as shown, each part layer 22p may be transferred to the belt 24 with proper registration with each support layer 22s to produce a combined part and support material layer, which is generally designated as layer 22. As can be appreciated, some of the layers 22 transferred to the layer transfusion assembly 20 may only include support material 66s or may only include part material 66p, depending on the particular support structure and 3D part geometries and layer slicing.

In an alternative embodiment, the part portions 22p and the support structure portions 22s may optionally be developed and transferred along the belt 24 separately, such as with alternating layers 22s and 22p. These successive, alternating layers 22s and 22p may then be transferred to the layer transfusion assembly 20, where they may be transfused separately to print or build the structure 26 that includes the 3D part 26p, the support structure 26f, and/or other structures.

Figure 3:
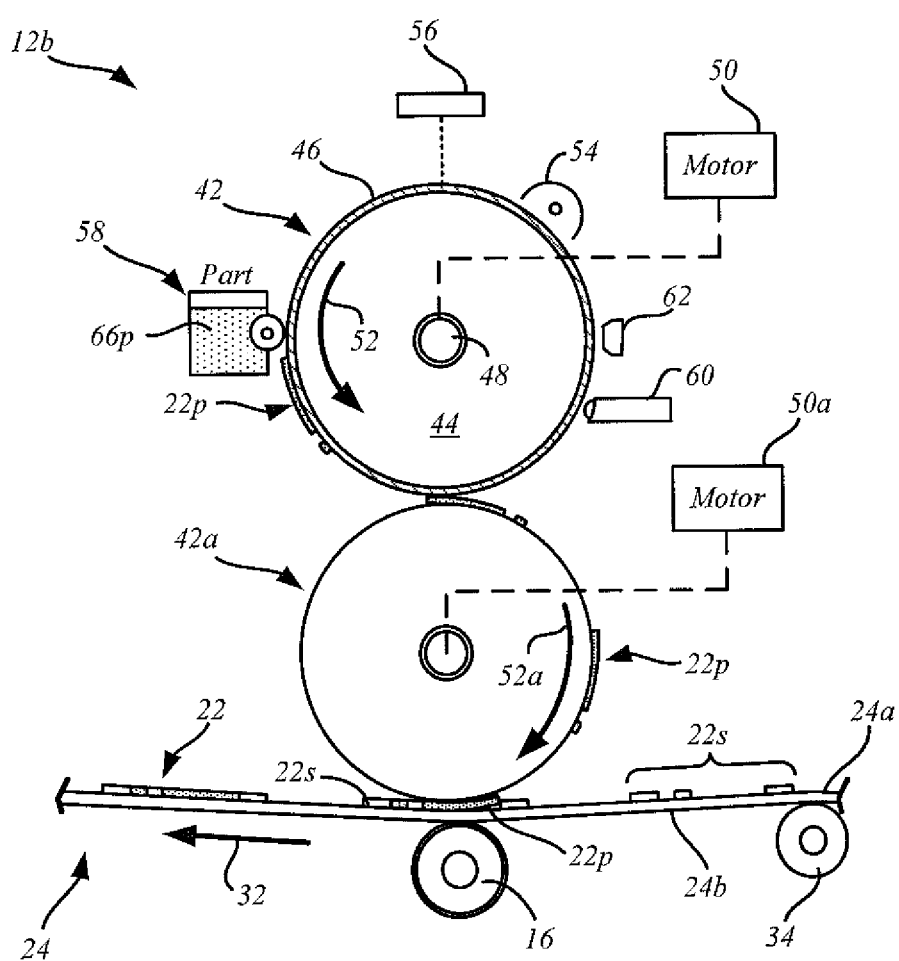
FIG. 3 is a schematic front view of an exemplary electrophotographic engine, which includes a transfer drum or belt, in accordance with exemplary embodiments of the present disclosure.

In a further alternative embodiment, one or both of the EP engines 12a and 12b may also include one or more transfer drums and/or belts between the photoconductor drum 42 and the belt or transfer medium 24. For example, as shown in FIG. 3, the EP engine 12b may also include a transfer drum 42a that rotates in the direction 52a that opposes the direction 52, in which drum 42 is rotated, under the rotational power of motor 50a. The transfer drum 42a engages with the photoconductor drum 42 to receive the developed layers 22p from the photoconductor drum 42, and then carries the received developed layers 22p and transfers them to the belt 24.

The EP engine 12a may include the same arrangement of a transfer drum 42a for carrying the developed layers 22s from the photoconductor drum 42 to the belt 24. The use of such intermediary transfer drums or belts for the EP engines 12a and 12b can be beneficial for thermally isolating the photoconductor drum 42 from the belt 24, if desired.

Figure 4:
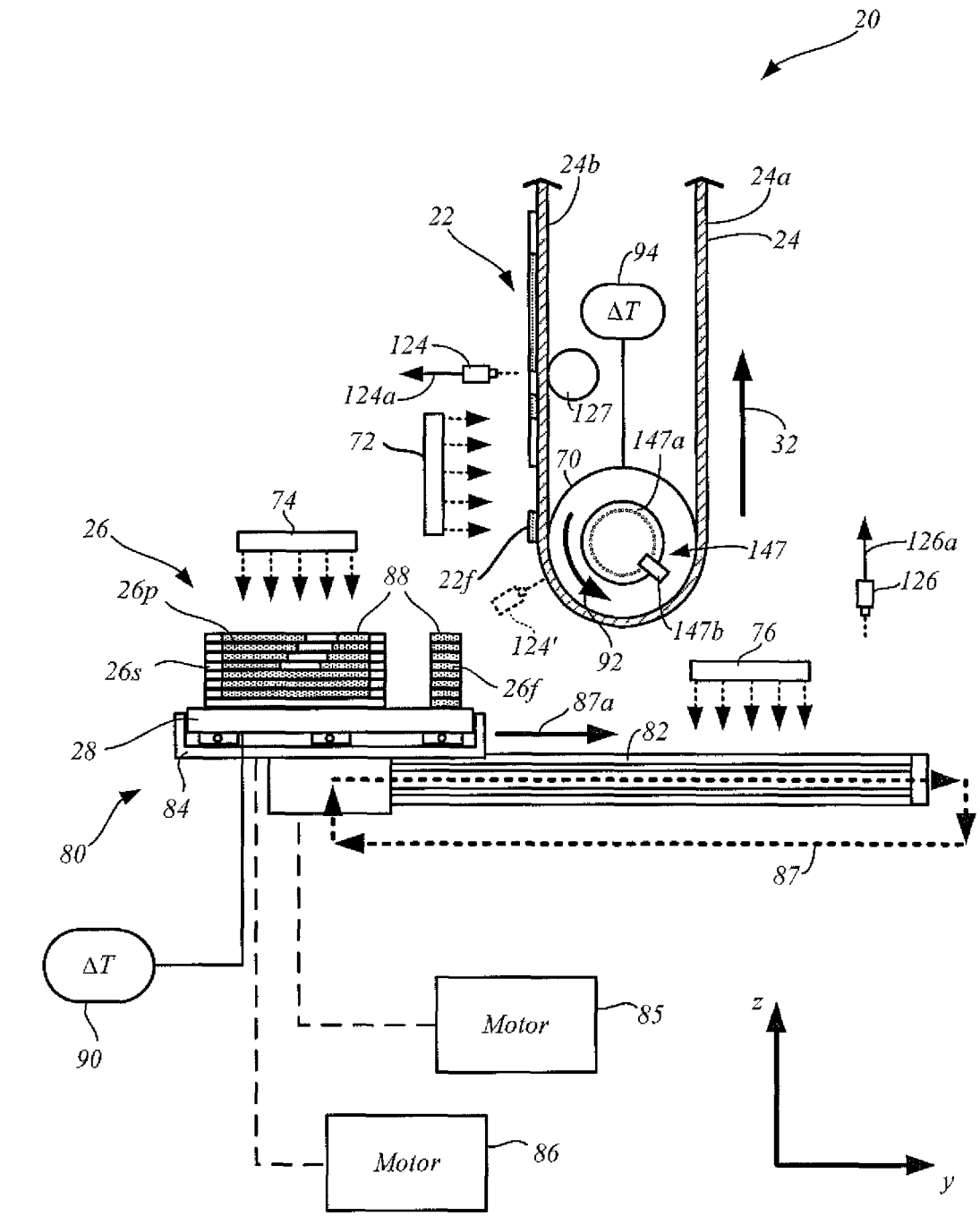
FIG. 4 is a schematic front view of an exemplary transfusion assembly of the system for performing layer transfusion steps with the developed layers, and for scanning the layers with one or more imaging sensors, in accordance with exemplary embodiments of the present disclosure.

FIG. 4 illustrates exemplary embodiments of the layer transfusion assembly 20. Embodiments of the transfusion assembly 20 include the build platform 28, a pressing element 70, pre-transfusion heaters 72 and 74, and/or an optional post-transfusion cooler 76. The build platform 28 is a platform assembly or platen of system 10 that is configured to receive the heated combined layers 22 (or separate layers 22p and 22s) for printing the structure 26, which includes a 3D part 26p formed of the part portions 22p, and support structure 26s formed of the support structure portions 22s, in a layer-by-layer manner. In some embodiments, the build platform 28 may include removable film substrates (not shown) for receiving the printed layers 22, where the removable film substrates may be restrained against build platform using any suitable technique (e.g., vacuum, clamping or adhering).

The build platform 28 is supported by a gantry 80 or other suitable mechanism, which is configured to move the build platform 28 along the z-axis and the y-axis, as illustrated schematically in FIGS. 1 and 4, and also along the x-axis that is orthogonal to the y and z axes. In some embodiments, the gantry 80 includes a y-stage gantry 82 that is configured to move the build platform 28 along at least the y-axis, and an x-stage gantry 84 that is configured to move the build platform 28 along the x-axis. In some embodiments, the y-stage gantry 82 is configured to further move the build platform 28 along the z-axis. Alternatively, the gantry 80 may include a z-stage gantry that is configured to move the build platform along the z-axis. The y-stage gantry 82 may be operated by a motor 85, and the x-stage gantry 84 may be operated by a motor 86, based on commands from the controller 36. The motors 85 and 86 may each be any suitable actuator an electrical motor, a hydraulic system, a pneumatic system, piezoelectric or the like.

In some embodiments, the y-stage gantry 82 supports the x-stage gantry 84, as illustrated in FIG. 4, or vice versa. In some embodiments, the y-stage gantry 82 is configured to move the build platform 28 and the x-stage gantry 84 along the z-axis and the y-axis. In some embodiments, the y-stage gantry 82 produces a reciprocating rectangular pattern where the primary motion is back-and-forth along the y-axis, as illustrated by broken lines 87 in FIG. 4. While the reciprocating rectangular pattern is illustrated as a rectangular pattern with sharp axial corners (defined by arrows 87), y-stage gantry 82 may move the build platform 28 in a reciprocating rectangular pattern having rounded or oval corners, so long as the build platform 28 moves along the y-axis process direction (illustrated by arrow 87a) during the pressing steps at the pressing element 70 described below. As discussed below, the y-stage gantry 82 allows the controller 36 to shift the location of a build surface 88, which is the top surface of the printed structure 26, along the y-axis to compensate for detected overlay errors along the y-axis to properly register or align the build surface 88 with the layer 22 on the belt 24 along the y-axis.

In some embodiments, the x-stage gantry 84 is configured to move the build platform 28 along the x-axis relative to the y-stage gantry 82, thereby moving the build platform 28 and the printed structure 26 in perpendicular or lateral directions relative to the y-axis process direction of arrow 87a. As discussed below, the x-stage gantry 84 allows the controller 36 to shift the location of the build surface 88 of the structure 26 along the x-axis to compensate for detected overlay errors along the x-axis to properly register or align the build surface 88 with the layer 22 on the belt 24 along the x-axis.

In the shown embodiment, the build platform 28 is heatable with heating element 90 (e.g., an electric heater). The heating element 90 is configured to heat and maintain the build platform 28 at an elevated temperature that is greater than room temperature (25° C.), such as at a desired average part temperature of 3D part 26p and/or support structure 26s, as discussed in Comb et al., U.S. Publication Nos. 2013/0186549 and 2013/0186558. This allows the build platform 28 to assist in maintaining 3D part 26p and/or support structure 26s at this average part temperature.

The pressing element 70 is configured to press and transfuse layers 22 from the belt to the build surface 88 of the structure 26. The pressing element 70 may take on any suitable form. In some embodiments, the pressing element 70 is in the form of a nip roller, as shown in FIG. 4. While embodiments will be described below using the nip roller 70 embodiment of the pressing element, it is understood that other pressing elements may also be used. In some embodiments, the nip roller 70 is a heatable element or heatable layer transfusion element, which is configured to rotate around a fixed axis with the movement of the belt 24. In particular, the nip roller 70 may roll against the rear surface 24b in the direction of arrow 92 while the belt 24 rotates in the feed direction 32. In the shown embodiment, the nip roller 70 is heatable with a heating element 94 (e.g., an electric heater). The heating element 94 is configured to heat and maintain nip roller 70 at an elevated temperature that is greater than room temperature (25° C.), such as at a desired transfer temperature for the layers 22.

The pre-transfusion heater 72 includes one or more heating devices (e.g., an infrared heater and/or a heated air jet) that are configured to heat the layers 22 on the belt 24 to a temperature near an intended transfer temperature of the layer 22, such as at least a fusion temperature of the part material 66p and the support material 66s, prior to reaching nip roller 70. Each layer 22 desirably passes by (or through) the heater 72 for a sufficient residence time to heat the layer 22 to the intended transfer temperature. The pre-transfusion heater 74 may function in the same manner as the heater 72, and heats the top surfaces of the 3D part 26p and support structure 26s on the build platform 28 to an elevated temperature, such as at the same transfer temperature as the heated layers 22 (or other suitable elevated temperature).

In some embodiments, the support material 66s, which is used to form the support structure portions 22s and the support structure 26s, preferably has a melt rheology that is similar to or substantially the same as the melt rheology of the part material 66p that is used to form the part portions 22p and the 3D part 26p. This allows the part and support materials 66p and 66s of the layers 22p and 22s to be heated together with the heater 72 to substantially the same transfer temperature, and also allows the part and support materials 66p and 66s at the top surfaces of the 3D part 26p and support structure 26s to be heated together with heater 74 to substantially the same temperature. Thus, the part portions 22p and the support structure portions 22s may be transfused together to the top surfaces of the 3D part 26p and the support structure 26s in a single transfusion step as the combined layer 22.

Optional post-transfusion cooler 76 is located downstream from nip roller 70 relative to the direction 87a in which the build platform 28 is moved along the y-axis by the y-stage gantry 82, and is configured to cool the transfused layers 22.

As mentioned above, in some embodiments, prior to building the structure 26 on the build platform 28, the build platform 28 and the nip roller 70 may be heated to their desired temperatures. For example, the build platform 28 may be heated to the average part temperature of 3D part 26p and support structure 26s (due to the close melt rheologies of the part and support materials). In comparison, the nip roller 70 may be heated to a desired transfer temperature for the layers 22 (also due to the close melt rheologies of the part and support materials).

During the printing or transferring operation, the belt 24 carries a layer 22 past the heater 72, which may heat the layer 22 and the associated region of the belt 24 to the transfer temperature. Suitable transfer temperatures for the part and support materials 66p and 66s of the present disclosure include temperatures that exceed the glass transition temperature of the part and support materials 66p and 66s, where the layer 22 is softened but not melted.

As further shown in FIG. 4, during operation, the y-stage gantry 82, or a combination of the y-stage gantry 82 and a z-stage gantry, may move the build platform 28 (with 3D part 26p and support structure 26s) in a reciprocating rectangular pattern 87. For example, as the y-stage gantry 82 moves the build platform 28 along the y-axis in the direction 87a below, along, or through the heater 74, the heater 74 heats the build surfaces 88 of the 3D part 26p and support structure 26s to an elevated temperature, such as the transfer temperatures of the part and support materials. As discussed in Comb et al., U.S. Publication Nos. 2013/0186549 and 2013/0186558, the heaters 72 and 74 may heat the layers 22 and the build surfaces 88 to about the same temperatures to provide a consistent transfusion interface temperature. Alternatively, the heaters 72 and 74 may heat layers 22 and the build surfaces 88 of the 3D part 26p and the support structure 26s to different temperatures to attain a desired transfusion interface temperature.

In general, the continued rotation of the belt 24 and the movement of the build platform 28 align the heated layer 22 with the heated build surfaces 88 of 3D part 26p and support structure 26s along the y-axis. The y-stage gantry 82 may move the build platform 28 along the y-axis at a rate that is synchronized with the rotational rate of the belt 24 in the feed direction 32 (i.e., the same directions and speed). This causes the rear surface 24b of the belt 24 to rotate around the nip roller 70 to nip the belt 24 and the heated layer 22 against the build surfaces 88 of the 3D part 26p and the support structure 26s at a pressing location or nip of the nip roller 70. This presses the heated layer 22 between the heated build surfaces 88 of the 3D part 26p and the support structure 26s at the location of the nip roller 70, which transfuses a portion of the heated layer 22 below the nip roller 70 to the top layers of 3D part 26p and support structure 26s.

As the transfused layer 22 passes the nip of the nip roller 70, the belt 24 wraps around the nip roller 70 to separate and disengage from the build platform 28. This assists in releasing the transfused layer 22 from the belt 24, allowing the transfused layer 22 to remain adhered to 3D part 26p and support structure 26s. Maintaining the transfusion interface temperature at a transfer temperature that is higher than its glass transition temperature, but lower than its fusion temperature, allows the heated layer 22 to be hot enough to adhere to the 3D part 26p and support structure 26s, while also being cool enough to readily release from the belt 24. Additionally, as discussed above, the close melt rheologies of the part and support materials allow them to be transfused in the same step.

It is understood that, in some instances, portions of the layer 22 may not completely separate from the belt 24 due to misalignment between the layer 22 and the surfaces 88, temperature variations between portions of the layer 22 and the surfaces 88, and/or other factors. As used herein, the transference of one or more of the developed layers 22 to the surfaces 88 includes the transference of at least a portion of the developed layers 22 to the surfaces 88 during the transfusion step, wherein some portions of the developed layers may not fully transfer from the belt 24.

After release, the y-stage gantry 82 continues to move the build platform 28 along the y-axis to the post-transfusion cooler 76. At the post-transfusion cooler 76, the top-most layers of 3D part 26p and the support structure 26s (including the transfused layer 22) may then be cooled.

In some embodiments, the transfusion assembly 20 includes one or more cooling units (not shown) downstream from the nip roller 70 relative to the direction 87a, which operate to cool the structure 26. Thus, as the y-stage gantry 82 moves the build platform 28 along the y-axis past the post-transfusion cooler 76, which may comprise blowers, to actively cool the top transfused layers 22 down to the average part temperature, such as discussed in Comb et al., U.S. Publication Nos. 2013/0186549 and 2013/0186558.

To assist in keeping the 3D part 26p and support structure 26s at the average part temperature, in some preferred embodiments, the heater 74 may operate to heat only the top-most layers of 3D part 26p and support structure 26s. For example, in embodiments in which heaters 72 and 74 are configured to emit infrared radiation, the 3D part 26p and support structure 26s may include heat absorbers and/or other colorants configured to restrict penetration of the infrared wavelengths to within the top-most layers. Alternatively, the heaters 72 and 74 may be configured to blow heated air across the top surfaces of 3D part 26p and support structure 26s. In either case, limiting thermal penetration into 3D part 26p and support structure 26s allows the top-most layers to be sufficiently transfused, while also reducing the amount of cooling required to keep 3D part 26p and support structure 26s at the average part temperature, such as using the cooler 76.

The y-stage gantry 82 may then actuate the build platform 28 downward, and move the build platform 28 back along the y-axis to a starting position along the y-axis, following the reciprocating rectangular pattern 87. The build platform 28 desirably reaches the starting position, and the build surfaces 88 are properly registered with the next layer 22 using the gantry 80. The same process may then be repeated for each remaining layer 22 of 3D part 26p and support structure 26s.

After the part structure 26 is completed on the build platform 28, the structure 26 may be removed from the system 10 and undergo one or more operations to reveal the completed 3D part 26p. For example, the support structure 26s may be sacrificially removed from the 3D part 26p using an aqueous-based solution such as an aqueous alkali solution. Under this technique, the support structure 26s may at least partially dissolve or disintegrate in the solution separating the support structure 26s from the 3D part structure 26p in a hands-free manner. In comparison, the part 26p is chemically resistant to aqueous solutions including alkali solutions. This allows the use of an aqueous alkali solution for removing the sacrificial support 26s without degrading the shape or quality of the 3D part 26p. Furthermore, after the support structure 26s is removed, the 3D part 26p may undergo one or more additional processes, such as surface treatment processes.

Figure 5:
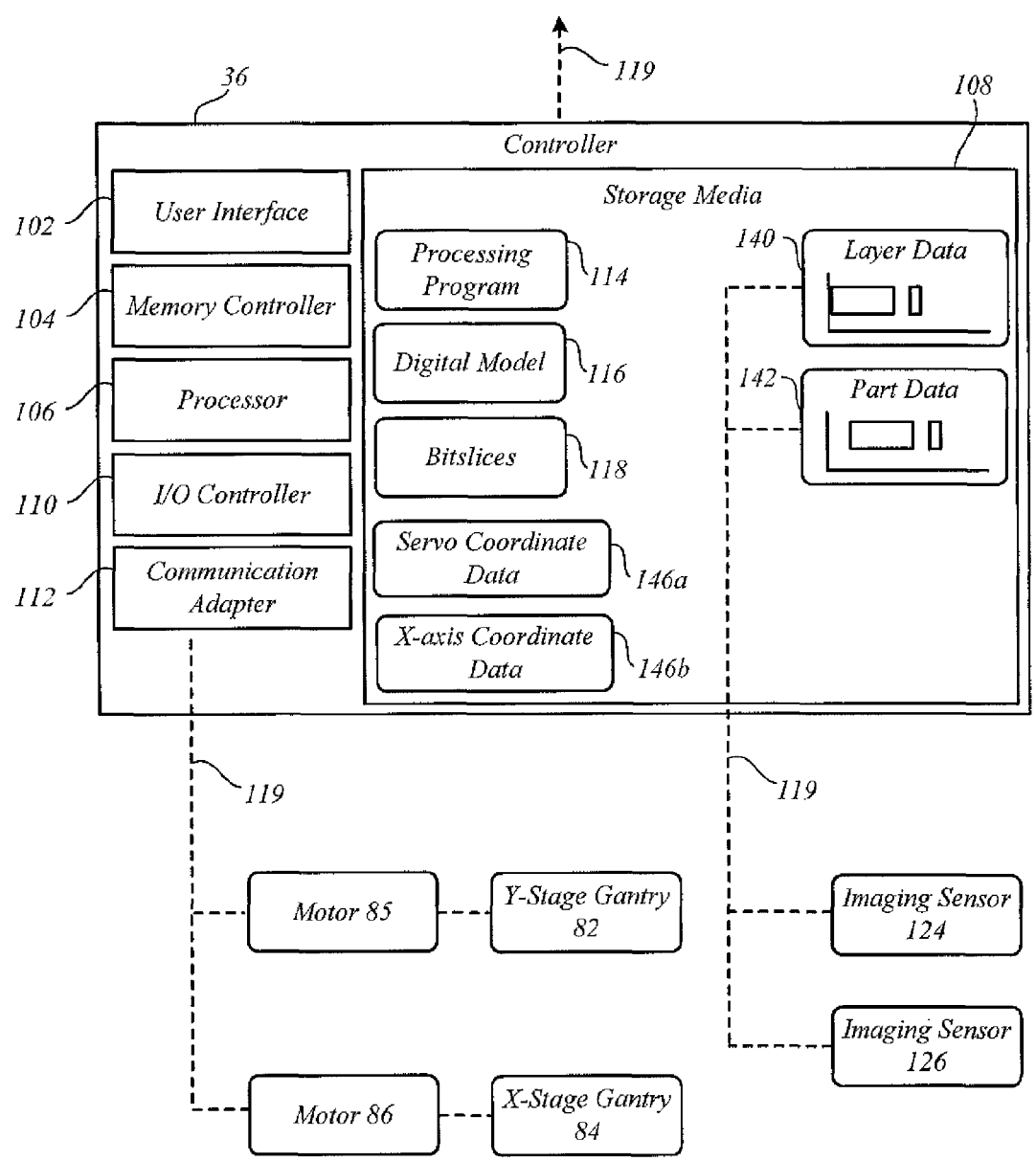
FIG. 5 is a schematic illustration of an exemplary controller of the system.

As shown in FIG. 5, the controller 36 may include any suitable computer-based hardware, such as a user interface 102, a memory controller 104, at least one processor 106, storage media 108, an input/output (I/O) controller 110, a communication adapter 112, and/or other computer-based hardware. The controller 36 may also include a variety of additional components that are contained in conventional computers or computing devices, servers, media devices, and/or printer controllers, for example.

The user interface 102 is a user-operated interface (e.g., keyboards, touch pads, touch-screen displays, display monitors, and other eye, voice, movement, hand-operated controls, etc.) configured to provide input to the controller 36. The memory controller 104 is a circuit assembly that interfaces the components of controller 36 with one or more volatile random access memory (RAM) modules of the storage media 108. The processor 106 is one or more computer-processing units configured to operate the controller 36, optionally with the memory controller 104. For instance, the processor 106 may include one or more microprocessor-based engine control systems and/or digitally-controlled raster imaging processor systems, as discussed above.

The storage media 108 is one or more internal and/or external data storage devices or computer storage media for the controller 36, such as volatile RAM modules, read-only memory modules, optical media, magnetic media (e.g., hard disc drives), solid-state media (e.g., FLASH memory and solid-state drives), analog media, and the like. The storage media 108 may retain an executable copy of the processing program 114, one or more digital models 116 to be printed with the system 10, and generated bitslices 118, each which may be utilized as disclosed in Comb et al., U.S. Pub. No. 2015/0266242.

The I/O controller 110 is a circuit assembly that interfaces the memory controller 104, the processor 106, and the storage media 108 with various input and output components of the controller 36, including the communication adapter 112. The communication adapter 112 is one or more wired or wireless transmitter/receiver adapters configured to communicate with components of the system 10 over conventional wired or wireless communication links represented by dashed lines 119.

As discussed above, embodiments of the present disclosure operate to reduce registration errors between the EP engines 12, and overlay errors between a printed layer 22 and the intermediate build surface 88 supported on the build platform 28. In some embodiments, the controller 36 preferably rotates photoconductor drums 42 of EP engines 12a and 12b at the same rotational rates that are synchronized with the line speed of belt 24 and/or with any intermediary transfer drums or belts. However, due to runout of the photoconductor drums 42, and/or the intermediary drums 42a, speed fluctuations of the belt 24, expansion or contraction of the belt 24, and other causes, x-y registration errors occur between the EP engines 12, which is manifested through x-y position misalignment between the part portions 22p the support structure portions 22s of a given layer 22. These x-y registration errors will then carry over to the transfusion step at the transfusion assembly 20 and impact the transfusion overlays resulting in x-y overlay errors.

Additional x-y overlay errors occur due to misalignment between the developed layers 22 on the belt 24 and the intermediate build surface 88 of the 3D part and support structure 26 on the build platform 28 during the transfusion step at the transfusion assembly 20. As discussed below in greater detail, such x-y overlay errors are manifested by overhanging ridges on the part 26, and by portions of the developed layer 22 remaining on the transfer belt 24 following the transfusion step using the transfusion assembly 20.

In some embodiments, such registration and overlay errors are corrected by the system 10 using one or more sensors that are used to detect position errors of the developed layers 22 on the belt 24 before the transfusion step, portions of the developed layers 22 on the belt 24 that are not transferred to the intermediate build surface 88 during the transfusion step, and/or misalignment between a transferred layer 22 and the intermediate build surface 88 to which it was transferred during the transfusion step.

The one or more sensors may take on any suitable form. In some embodiments, the sensors include one or more imaging sensors that are configured to discharge electromagnetic energy and capture electromagnetic energy with a suitable camera or optical sensor. In some embodiments, each imaging sensor has a resolution that is at least approximately twice the pixel resolution of the EP engines 12. For example, when the EP engines have a pixel resolution of 600 dpi, each imaging sensor preferably has an imaging resolution of at least 1200 dpi.

One exemplary imaging sensor includes an optical line scan imager. In some embodiments, the optical line scan imager includes a one-dimensional photodiode array for imaging, which allows for high line rates for fiducial imaging without having high data rates, such as when two-dimensional photodiode arrays are utilized. In some embodiments, the imaging sensors include two-dimensional optical imagers and strobe illumination, which has the advantage of fixing the Y-magnification optically rather than relying on velocity measurements of the transfer medium.

In some embodiments, the one or more imaging sensors include an optical transmission sensor that is generally a large single photodiode behind a slit, such as an inch long slit that is oriented in the y-direction. In accordance with this embodiment, the transfer medium 24 may be formed of a white opalescent plastic, or other suitable material.

Another exemplary imaging sensor includes a time-delayed-integration camera, which is generally a cross between a one-dimensional and a two-dimensional imager. Here, an image is integrated in a one-dimensional line oriented in the y-direction for a time, then that charge is transferred to an adjacent one-dimensional imager and integrated for a time, then that charge is transferred to an adjacent one-dimensional imager and integrated for a time, and so forth. The time delay is correlated with the speed of the transfer medium. This provides an acceptable solution to accumulate one-dimensional images with a good signal-to-noise ratio.

In some embodiments, one or more of the sensors include a charge or dielectric (capacitance) sensor that is configured to detect an electrical charge or dielectric of portions of the layers 22. In some embodiments, the one or more sensors include a heat (i.e., infrared) sensor. Thus, while the one or more sensors described below focus on the use of imaging sensors, those skilled in the relevant art understand that one or more of the imaging sensors may be replaced by other suitable sensors to provide the desired detection function.

In some embodiments, the transfusion assembly 20 includes the one or more sensors, such as imaging sensors 124 and 126 (FIG. 4), that may be used to detect positions of the layers 22 prior to and/or after the layer transfusion steps, during which a layer 22 is transfused to the build surface 88 of the structure 26 on the platform 28. Outputs or output signals 124a and/or 126a from the sensors 124 and 126 indicate the detected positions of the layers 22. In some embodiments, the output signals 124a and/or 126a represent images or scans (i.e., image data) obtained by the sensors 124 and 126, from which the positions of the detected layers 22 may be determined by the controller 36. In some embodiments, the controller 36 compares the output signals 124a and/or the image data, from the sensors 124 and 126 to a set point to compensate for the x-y registration errors occurring at the engagements between EP engines 12a and 12b and belt 24, and/or x-y overlay errors that occur at the transfusion assembly 20. The controller 36 may also use the scans or images from the imaging sensors to correct or compensate other errors, such as skew errors and magnification errors.

In some embodiments, one or more of the layers 22 formed using the EP engines 12 includes a fiducial portion 22f, as shown in FIGS. 1 and 4, formed by one of the EP engines 12. The fiducial portion 22f may be formed by a support structure EP engine 12a, a part EP engine 12b, or an EP engine 12 that uses a different material than that used by the engines 12a and 12b. The fiducial portion 22f of each layer 22 forms a fiducial structure 26f of the structure 26 on the build platform 28 using the transfusion assembly 20. Thus, references to the structure 26 include a structure 26 formed in a layer-by-layer manner that includes the 3D part 26p, support structure 26s, and/or fiducial structure 26f, and an intermediate build surface 88, onto which a subsequent layer 22 can be applied. For example, in some embodiments, the layer 22 including the fiducial portion 22f is carried by the belt 24 past the heater 72, which may heat the layer 22 to the desired elevated temperature. The layer 22 is transfused to the build surface 88 of the structure 26 on the build platform 28, such that the part and support portions 22p and 22s are transfused to corresponding portions of the structure 26, such as those corresponding to the part 26p and the support structure 26s, and the fiducial portion 22f is transfused to the build surface 88 of the fiducial structure 26f. The belt 24 is then disengaged from the transferred layer 22.

In some embodiments, the fiducial portions 22f are offset and separate from the part portions 22p and the support structure portions 22s of each layer 22. As a result, the fiducial structures 26f are also offset and separate from 3D part 26p and the support structure 26s, as shown in FIG. 4. This allows imaging sensors 124 and 126 to effectively scan the dimensions of the fiducial portions 22f and the fiducial structure 26f. Accordingly, the controller 36 may utilize the scanned position of the fiducial portions 22f and/or the fiducial structure 26f for detecting overlay errors, as opposed to the more complicated bitslice geometries of the 3D part 26p and the support structure 26s.

However, in alternative embodiments, the controller 36 may utilize the scans of the 3D part 26p and/or the support structure 26s for detecting overlay errors, if desired. As such, scanning a 3D part (e.g., with imaging sensors 124 and 126) may refer to the scanning of the intended 3D part (e.g., 3D part 26p), the support structure (e.g., support structure 26s), and/or a fiducial structure (e.g., fiducial structure 260).

In some embodiments, the imaging sensor 124 is located upstream from the nip of the nip roller 70 relative to the belt feed direction 32 and the heater 72 is positioned between the imaging sensor 124 and the nip of the nip roller 70, as shown in FIG. 4. This ensures that the heater 72 can be positioned in close proximity to the nip of the nip roller 70, which can benefit the transfusion of the layers 22 to the part 26. In some embodiments, the imaging sensor 124 is located upstream from the nip of the nip roller 70 relative to the belt feed direction 32 a distance of greater than 4 inches, greater than 6 inches, greater than 8 inches, greater than 10 inches and greater than 12 inches, for example. In some embodiments, a belt support roller 127 engages the rear surface 24b of the belt 24 to support the front surface 24a in a steady position relative to the imaging sensor 124 so as to eliminate belt flutter and ensure the required depth-of-focus for the imaging sensor 124. A similar belt support roller can be used to stabilize the portion of the belt 24 imaged by the sensor 126. In some embodiments, the imaging sensor 124 is located in close proximity to the nip of the nip roller 70, as indicated by imaging sensor 124' shown in phantom lines, such as about 3 inches from the nip of the nip roller 70.

Figure 6A:
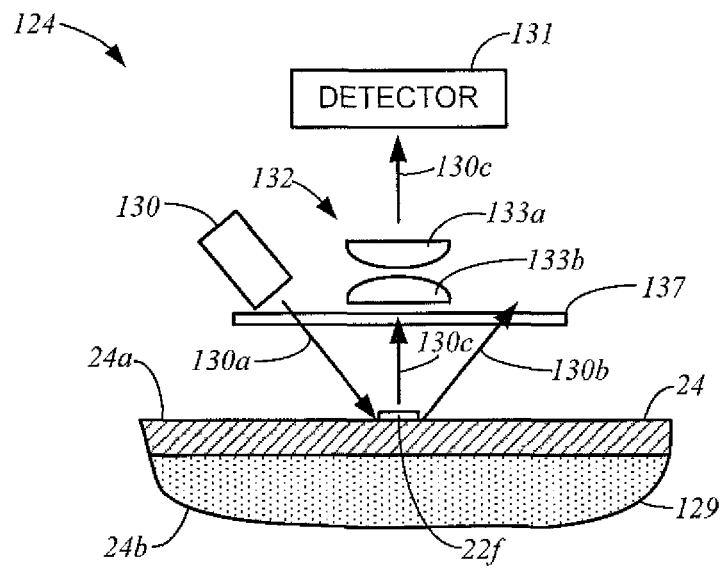
FIGS. 6A and 6B are simplified diagrams of an exemplary imaging sensor, formed in accordance with embodiments of the present disclosure.
Figure 6B:
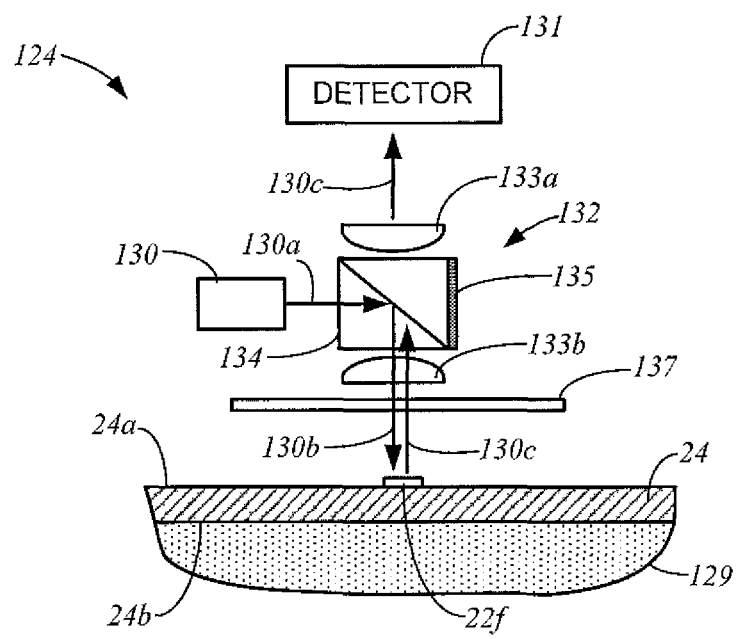

FIGS. 6A and 6B are simplified diagrams of an exemplary imaging sensor 124, formed in accordance with embodiments of the present disclosure. Imaging sensor 126 may be formed in a similar manner as imaging sensor 124. The imaging sensor 124 is positioned adjacent the belt 24 that is supported by a roller 129, which represents the nip roller 70 or the belt support roller 127 (FIG. 4), and is shown in cross-section along a plane extending through the axis of rotation of the roller 129.

In some embodiments, the imaging sensors 124 and 126 each include an electromagnetic energy source 130 and a camera or detector 131. The light source 130 is configured to discharge electromagnetic energy 130a, and the detector 131 includes an imaging sensor configured to image portions of the belt surface 24a, such as a line scan camera. In some embodiments, the imaging sensors 124 and/or 126 also include optics 132 that are configured to, direct electromagnetic energy to a desired location, focus electromagnetic energy on the detector 131, and/or perform another optical function. In some embodiments, the optics 132 include one or more lenses 133, such as lens 133a and 133b, a beam splitter 134 (FIG. 6B), and/or other optical components.

In some embodiments, the imaging sensors 124 and/or 126 are isolated from the environment of the layers 22 and/or the structure 26. This prevents the imaging sensors 124 and/or 126 from being contaminated by the material 66 forming the layers 22 and the structure 26, or from other materials. In some embodiments, the containment of the imaging sensors 124 and/or 126 includes a transparent shield through which the electromagnetic energy 130 may pass, such as represented by the exemplary shield 137 shown in FIG. 6a and FIG. 6b. It may be necessary to periodically wipe off stray material 66 from the shield 137 to allow for a clear passage of the electromagnetic energy 130 through the shield 137.

The electromagnetic energy sources 130 of the imaging sensors 124 and 126 can take on any suitable form. In some embodiments, the electromagnetic energy sources 130 of the imaging sensors 124 and/or 126 include light emitting diodes (LED's), laser diodes or other laser sources, and/or other suitable electromagnetic energy emitters. In some embodiments, the electromagnetic energy sources 130 of the imaging sensor 124 discharges electromagnetic energy 130a, to which the belt 24 is substantially transparent, or at least substantially opaque, to allow at least a portion of the electromagnetic energy 130a to pass through the belt 24. In some embodiments, the electromagnetic energy 130a discharged from the electromagnetic energy sources 130 of the imaging sensors 124 and/or 126 has a wavelength in the range of about 300-1000 nm, such as about 405 nm (e.g., ±50 nm) to about 635 nm (e.g., ±50 nm), for example. In some embodiments, the belt 24 is formed of Kapton, which is a polyimide film produced by DuPont, that is generally opaque to electromagnetic energies within the above wavelength range.

FIG. 6A illustrates the imaging sensor 124 in an exemplary darkfield configuration, and FIG. 6B illustrates the imaging sensor 124 in an exemplary brightfield configuration. In some embodiments of the darkfield configuration, the electromagnetic energy source 130 directs an incident beam 130a of electromagnetic energy toward the belt 24 and the supporting roller 129 at an oblique angle to the axis of rotation of the roller 129, as shown in FIG. 6A. The incident beam 130a is generally transmitted through the belt 24 and is reflected by the supporting roller 129 as a reflected beam 130b. In some embodiments, the incident and reflected beams 130a and 130b are oriented in a plane that extends through the axis of the supporting roller 129.

When the electromagnetic energy 130a discharged from the light source 130 has a wavelength of approximately 605 nm, the supporting roller 129 scatters the incident beam 130a transmitted through the belt 24. This produces a general glow around the supporting roller 129 that is locally obfuscated by the fiducial segment 22f (shown), or a part portion 22p or support structure portion 22s, for example. The fiducial segment 22f or other portion of the layer 22 is discernable in the image produced by the detector 131 as a darkened portion, when the image is processed by the detector 131 and/or the controller 36, for example.

Alternatively, when the light source 130 transmits electromagnetic energy 130a having a wavelength of about 405 nm, the rear surface 24b of the belt 24 and the supporting roller 129 become invisible to the detector 131. As a result, the incident beam 130a having a wavelength of 405 nm in the darkfield configuration of FIG. 6A creates a bright image where the fiducial segment 22f (shown), part portion 22p or support structure portion 22s, scatters the electromagnetic energy of the incident beam 130a into the beam 130c that is captured by the aperture of the optics 132 for imaging by the detector 131. Thus, the fiducial segment 22f or other portion of a layer 22 on the belt 24 can be discerned as a bright portion of the image that is surrounded by the darker belt 24, when the image is processed by the detector 131 and/or the controller 36, for example.

In some embodiments of the brightfield configuration (FIG. 6B), the light source 130 emits electromagnetic energy 130a toward the beam splitter 134, which directs beam 130a toward the fiducial segment 22f or other portion of a layer 22 as beam 130b. The fiducial segment 22f or other portion of the layer 22 on the belt 24 reflects the beam 130b from the splitter 134 as electromagnetic energy 130c. The electromagnetic energy 130c is then delivered to the detector 131 through the optics 132, such as the lens 133b, beam splitter 134 and lens 133a, as shown in FIG. 6B. In some embodiments, an absorber 135 is positioned on the opposing side of the beam splitter 134 from the light source 130 to absorb electromagnetic energy 130a that is not directed toward the belt 24. The reflection of the incident beam 130a off the belt 24 sets a white level. The reflection of the incident beam 130a off the toner or layer 22 sets a black level. The ratio of the white to black levels may be approximately 40:1 when the beam 130a has a wavelength of approximately 405 nm and when the belt 24 uses a 20 µm Kapton film, for example. The portion of the beam 130a that travels through the belt 24 and reflects from the roller 129 is significantly attenuated. This allows for the discernment of the fiducial segment 22f or other portion of the layer 22 from the surrounding belt 24 in the image produced by the detector 131, when the image is processed by the detector 131 and/or the controller 36, for example.

The controller 36 may receive image data from the imaging sensors 124 and 126, and respectively store the received image data as layer data 140 (from the imaging sensor 124) and part data 142 (from the imaging sensor 126). Additionally, the storage media 108 may also retain servo coordinate data 146a, which maps the servo speed and timing of the y-stage gantry 82 with the rotational speed and timing of the belt 24. Furthermore, the storage media 108 may also retain x-axis coordinate data 146b, which is a coordinate map for positioning the build platform 28 along the lateral x-axis with the x-stage gantry 84.

As explained below, the controller 36 may compare the layer data 140 to the part data 142 to detect x-y overlay errors at the transfusion assembly 20. As mentioned above, the x-y overlay errors can be impacted by the x-y registration errors at the EP engines 12a and 12b, as well as alignment errors occurring at the transfusion assembly 20. For instance, the belt 24 may thermally expand or stretch while heating up, which can cause the rotational timing of the belt 24 to drift over time relative to the information in the servo coordinate data 146a. This can accordingly cause successive pressed layers 22 to drift in one or more directions in the x-y build plane, which can result in overhanging ridges. If left uncorrected, these overhanging ridges can grow along the z-axis and potentially impact the system performance.

Figure 7A:
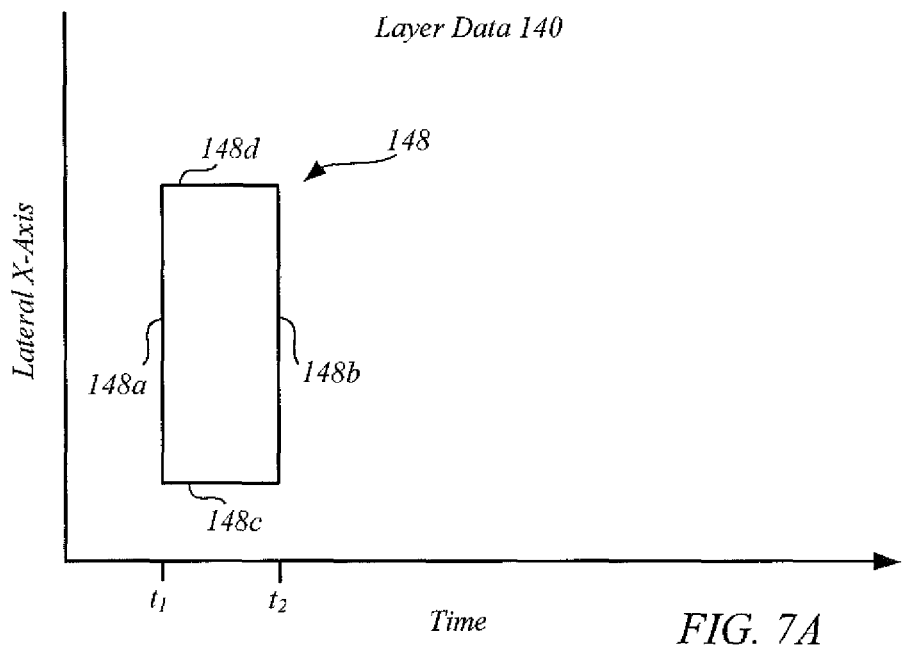
FIGS. 7A and 7B are exemplary graphical plots of scanned images for detecting overlay errors, in accordance with embodiments of the present disclosure.
Figure 7B:
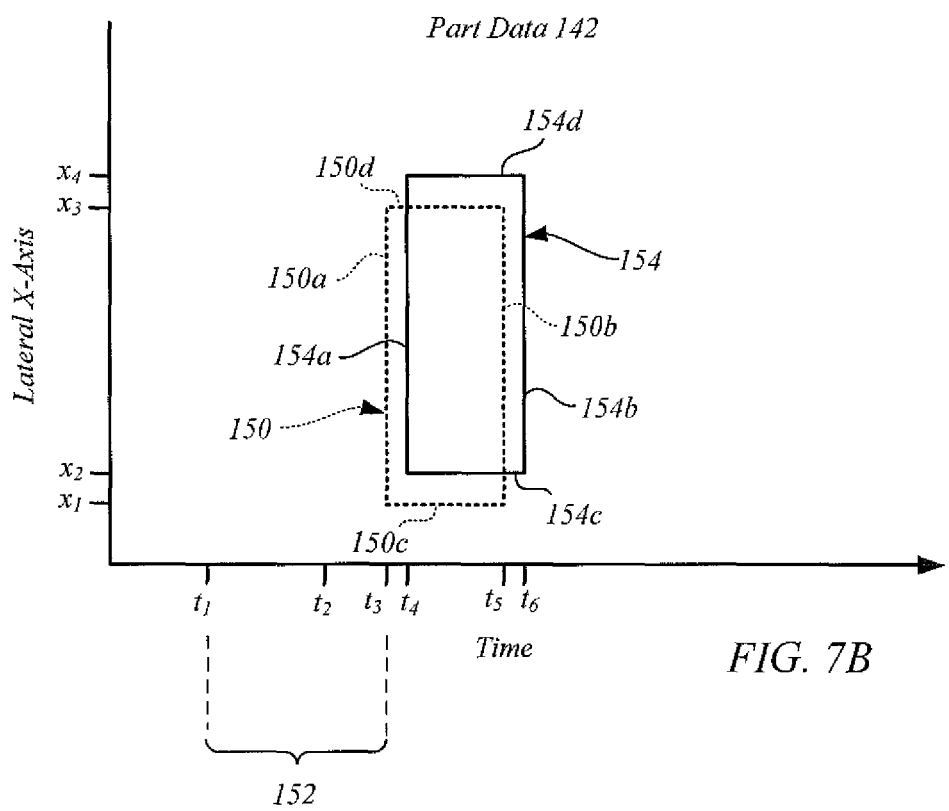

FIGS. 7A and 7B illustrate an exemplary comparison of the layer data 140 and the part data 142 that the controller 36 may perform to detect any x-y overlay errors. It is understood that the plots in FIGS. 7A and 7B are merely illustrative, and the controller 36 can perform the comparison on a computational basis.

As shown, the scanned images for the layer data 140 and the part data 142 may each be plotted on a time-based axis. Because the belt 24 and the build platform 28 preferably move at synchronized rates, the time axes of the shown plots correspond to the movement speeds and directions of the belt 24 (in the direction of arrow 32) and build platform 28 (in the direction of arrow 87a).

In some embodiments, the controller 36 may obtain the speed and timing of the belt 24 from a suitable encoder, such as an encoder that monitors rotation of one of the drive rollers 33 or the idler rollers 34, for example. In some embodiments, the system 10 includes an encoder 147 that monitors the rotational velocity of the nip roller 70, as shown in FIG. 4. The rotational velocity of the nip roller 70 is used by the controller 36 to accurately determine the speed and timing of the surface 24a of the portion of the belt 24 in contact with the nip roller 70, such as at the nip, by performing a Fourier transform or the equivalent on the output from the encoder 147, for example. Exemplary embodiments of the encoder 147 include an encoder wheel 147a that rotates with the nip roller 70 and an optical sensor 147b that detects the rotation of the encoder wheel. Other suitable encoder designs may also be used to form the encoder 147. In some embodiments, the encoder 147 is corrected for run-out of the nip roller 70 to increase the accuracy to which the speed of the belt 24 can be determined by the controller 36.

In one example, the belt velocity has a nominal velocity as a function of time is calculated using the equation provided below, where $v_{nominal}$ is an estimation of the actual velocity of the belt, $v_0$ is a steady state error, $v_1$ to $v_3$ are the peak variations of belt oscillation modes with frequencies $\omega_1$ to $\omega_2$ and phases $\varphi_1$ to $\varphi_3$, and $v_{nominal}$ is the velocity required These coefficients can be continually fitted to data from the encoder 147 so that the integrated position of the belt 24 at the nip of the nip roller 70 can be accurately predicted by the controller 36. This is used by the controller 36 to control for overlay errors in the y-direction. Additionally, the runout of the nip roller 70 can be extracted from the encoder data prior to computing the belt velocities.

$$v_{belt}(t)=v_{nominal}+v_0+v_1(\sin(\omega_1 t+\varphi_1))+v_2(\sin(\omega_2 t+\varphi_2))+v_3(\sin(\omega_3 t+\varphi_3))+v_{random}(t)$$

The following discussion focuses on the scanned images for the fiducial segment 22f and the fiducial structure 26f, where the corresponding images for the layers 22p and 22s, the 3D part 26p, and the support structure 26s are omitted for ease of discussion. However, the controller 36 may alternatively use the scanned images of the layers 22p and 22s, the 3D part 26p, and the support structure 26s in the same manner to detect x-y overlay errors, if desired.

As shown in FIG. 7A, the layer data 140 includes the image 148, which corresponds to a scan of a fiducial segment 22f for one of the developed layers 22 on the belt 24. This scan is taken by the imaging sensor 124 prior to the transfusion step as the belt 24 rotates past the imaging sensor 124. The image 148 includes a leading edge 148a of the fiducial segment 22f, which shows up at time $t_1$, and a trailing edge 148b of the fiducial segment 22f, which shows up at time $t_2$. The difference between times $t_1$ and $t_2$ depends on the rotational speed of the belt 24 and the dimensions of the fiducial segment 22f. Additionally, the image 148 also shows lateral edges 148c and 148d that extend along the lateral x-axis.

After the same fiducial segment 22f is transfused to the fiducial structure 26f at the nip roller 70, the transfused fiducial segment 22f then passes the imaging sensor 126. The controller 36 may refer to the servo coordinate data 146a and the image 148 to predict the location and dimensions of the image scanned by the imaging sensor 126. This is illustrated by a predicted image 150 in FIG. 7B (shown with broken lines) having a leading edge 150a at time $t_3$, a trailing edge 150b at time $t_5$, and lateral edges 150c and 150d.

The time $t_3$ for the leading edge 150a is expected to be offset from time $t_1$ for the leading edge 148a by the expected time required to move the fiducial segment 22f from the imaging sensor 124 to the imaging sensor 126, which is based on the process distance between the imaging sensors 124 and 126, and the speeds of the belt 24 and the build platform 28. In other words, the duration 152 between times $t_1$ and $t_3$ is the predicted duration if the movements of the belt 24 and the build platform 28 are properly synchronized.

The lateral edges 150c and 150d of the image 150 are predicted to have the same locations along the lateral x-axis as the lateral edges 148c and 148d of image 148 based on the mapping from the x-axis coordinate data 146b. In the shown example, the lateral edge 150c is at location $x_1$, and the lateral edge 150d is at location $x_3$, which are offset along the lateral x-axis by the dimensions of fiducial segment 22f.

However, as further shown in FIG. 7B, the part data 142 includes the image 154, which corresponds to an actual scan of the same fiducial segment 22f after being pressed onto and transfused to the fiducial structure 26f. This scan is taken by the imaging sensor 126 after the transfusion step performed at the nip roller 70. The image 154 includes a leading edge 154a of the transfused fiducial segment 22f, which shows up at time $t_4$, and a trailing edge 154b of the transfused fiducial segment 22f, which shows up at time $t_6$. Moreover, the image 154 also includes a lateral edge 154c at location $x_2$ and a lateral edge 154d at location $x_4$.

A comparison of the images 150 and 154 illustrates the x-y overlay errors that occurred at the transfusion assembly 20. The y-axis alignment errors can be identified by the differences along the time axis between the leading edges 150a and 154a (i.e., between times $t_3$ and $t_4$), and between the trailing edges 150b and 154b (i.e., between times $t_5$ and $t_6$). These y-axis alignment errors can be due to numerous potential process conditions. For instance, thermal expansion or stretching of the belt 24 can result in misalignment drifts along the y-axis over time relative to the encoder of the belt 24. This can induce errors in the servo coordinate data 146a for synchronizing the belt 24 and the build platform 28.

The x-axis alignment errors can be identified by the differences along the lateral x-axis between the lateral edges 150c and 154c (i.e., between locations $x_1$ and $x_2$), and between the lateral edges 150d and 154d (i.e., between locations $x_3$ and $x_4$). These x-axis alignment errors can be attributed to numerous factors, such as belt jitter, lateral shifts of the build platform 28 or the build sheets on the build platform 28, part creep or deformation in the lateral directions, and the like.

The misalignments between the lateral edges 150d and 154d along the x-axis, and between the trailing edges 150b and 154b along the y-axis correspond to an overhanging ridge of the part material for the printed fiducial structure 26f. As mentioned above, after the pressing step at the nip roller 70, the fiducial portion 22f preferably remains in sufficient intimate contact with the underlying build surface 88 to remain adhered to fiducial structure 26f, and to cleanly release from the belt 24.

Figure 8:
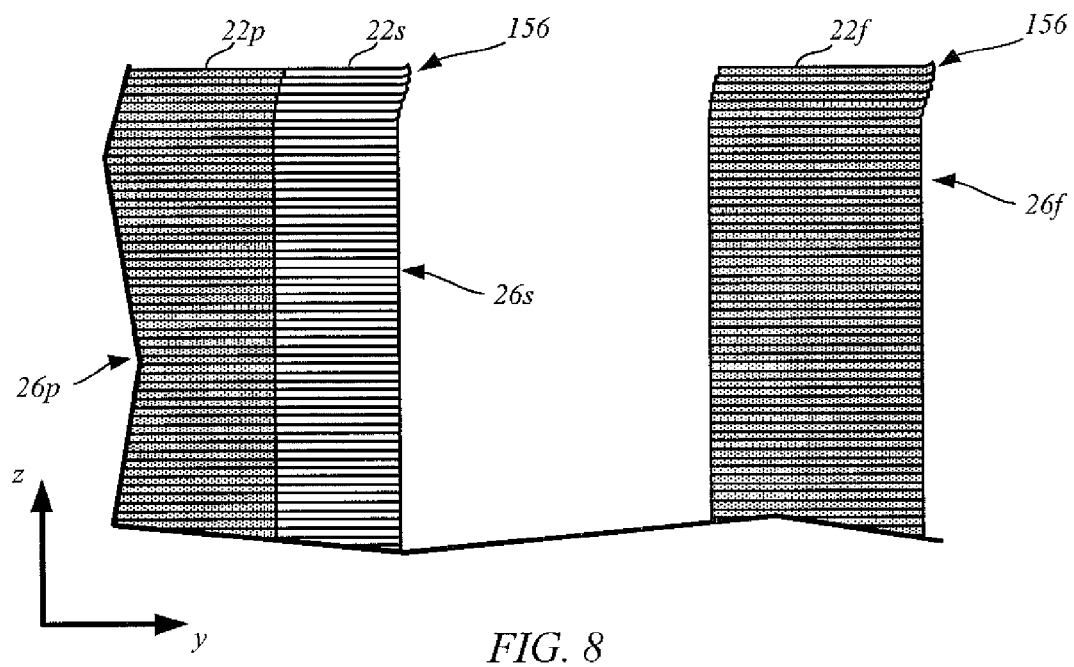
FIG. 8 is a side view of an exemplary printed part illustrating overhanging ridges that can occur due to overlay errors.

However, at the locations of this overhanging ridge, the part material is not adhered to any underlying build surface 88. Thus, as shown in FIG. 8, some of the part material at the overhanging ridge (referred to as overhanging ridge 156) can be pulled upward when releasing from the belt 24 at the nip roller 70 due to its relatively weaker bond to the printed structure 26. This upward pulling of the part material can cause the trailing edges of the printed structure 26 to stick up along the z-axis at the overhanging ridges 156. If the overhanging ridges 156 are allowed to grow along the z-axis over multiple layers of the printed structure 26, they can lead to unacceptable part quality and even have an impact the system performance.

As mentioned above, additional errors between successive layers 22 at the transfusion assembly 20 that may be identified and corrected by the system 10 include skew errors and magnification errors. Skew errors are errors relating to an angular orientation of the layer 22 relative to its intended orientation within a given image frame of the belt 24, such as relative to the x-axis or y-axis, or relative to the top layer 22 of the part structure 26 on the build platform 28. Magnification errors are errors relating to the surface area of the layer 22 relative to its intended surface area within a given image from of the belt 24 or relative to the top player 22 of the part structure 26. Embodiments of the system 10 detect skew errors and/or magnification errors using the imaging sensors 124 and/or 126 and the controller 36 using similar techniques to those described above for detecting the x-y overlay errors.

Figure 9A:
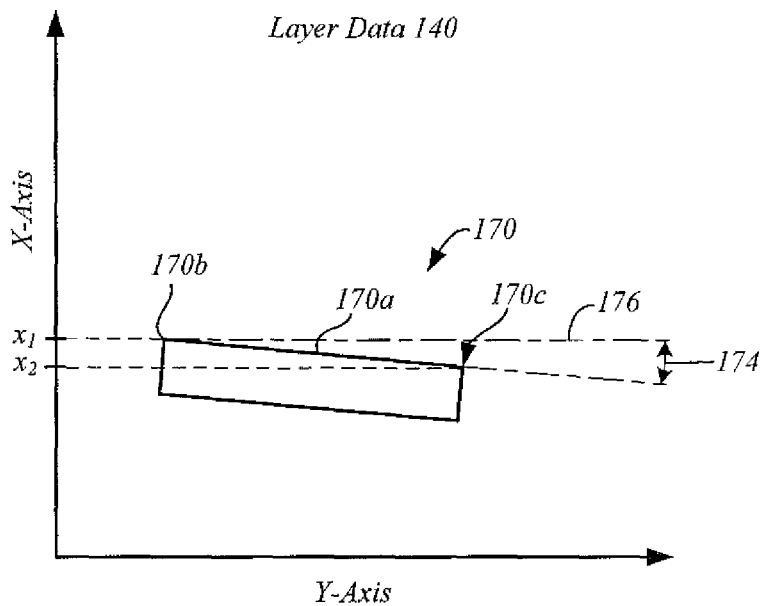
FIGS. 9A and 9B are graphical plots of exemplary scanned images for detecting overlay errors, in accordance with embodiments of the present disclosure.
Figure 9B:
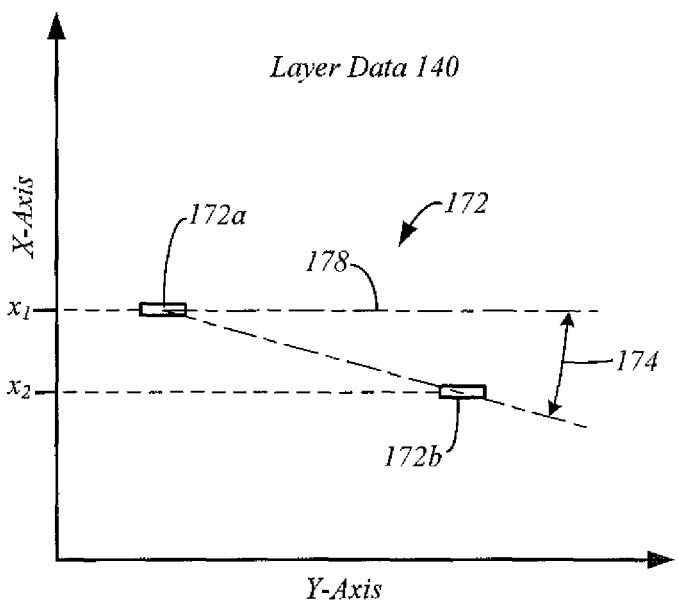

FIGS. 9A and 9B are graphical plots of exemplary scanned images 170 and 172 or layer data 140 captured by the imaging sensor 124 of a layer 22 or portion thereof. Thus, the images 170 and 172 each represent a fiducial portion 22f, a part portion 22p or a support structure portion 22s of a layer 22 on the belt 24 scanned or imaged using the imaging sensor 124.

In some embodiments, the controller 36 uses the layer data 140 and/or the image 170 to detect the skew error of a layer 22, or portion thereof, printed by the one or more of the EP engines 12 to a given image frame of the belt 24 by determining the angular difference between the angular orientation of the image 170 or 172 to the anticipated angular orientation of the image 170 or 172. In some embodiments, the determined skew error is used to correct the printing of future layers 22 to the belt 24 by the corresponding EP engine or engines 12 that formed the layer 22 or portion thereof corresponding to the image 170 or 172. Thus, the skew error associated with each of the EP engines and/or each of the image frames of the belt 24 by adjusting calibration parameters for the EP engines 12.

In some embodiments, the skew error in the form of a skew angle 174 is determined by the controller 36 using any suitable technique. In some embodiments, the skew error is determined by the controller 36 by comparing features of the images 170 and 172 to the anticipated location of the features. Differences in the location between the features of the images 170 and 172 and their anticipated location can be used to determine the skew angle 174. For example, image 170 in FIG. 9A may represent a fiducial portion 22f that is skewed relative to the anticipated orientation of the fiducial portion 22f by a skew angle 174, because the anticipated or intended orientation of the edge 170a of the fiducial portion 22f is aligned with the x1 location or parallel with the y-axis, as indicated by line 176. The skew angle 174 may be determined using the distance measured along the x-axis between the corner 170b located at position x1, and the corner 170c located at position x2, and the length of the edge 170a, for example.

Similarly, image 172 shown in FIG. 9B may represent a layer 22 having a pair of fiducial portions 22f represented by portions 172a and 172b in the image 172 that were printed to an image frame of the belt 24 by an EP engine 12. The imaged layer 22 has a skew angle 174 relative to the anticipated orientation of the fiducial portions 172a and 172b being aligned with the x1 location or parallel with the y-axis, as indicated by line 178. The skew angle 174 may be determined using the distance measured along the x-axis between the fiducial portion 172a located at position x1, and the fiducial portion 172b located at position x2, and the distance separating the fiducial portions 172a and 172b, for example.

In some embodiments, the images 170 and 172 in FIGS. 9A and 9B represent registration marks that are formed on the front surface 24a of the belt 24 within the image frame. The skew angle 174 thus represents a skew of the image frame of the belt 24 at the imaging sensor 124. The skew angle 174 may be calculated by the controller 36 using any suitable technique, such as those discussed above, and used to adjust the calibration of the EP engines for the image frame to compensate for the skew error.

Skew error that is introduced from the location of the imaging sensor 124 to the nip of the nip roller 70 can also be detected or determined through a comparison of the layer data 140 to the part data 142, in accordance with the techniques described above.

Magnification errors may be detected by the controller 36 through a comparison of the dimensions or surface area of the imaged or scanned layer 22 or portion thereof, such as a fiducial portion 22f, a part portion 22p or a support structure portion 22s, to the anticipated dimensions or surface area of the scanned layer 22 or portion thereof. Magnification errors are typically manifested as dimension errors along the x-axis caused by the expansion or contraction of the belt 24. Magnification errors in the y-direction may also be detected and corrected by the controller 36 using similar techniques to those described below relating to the magnification errors in the x-direction.

Figure 10:
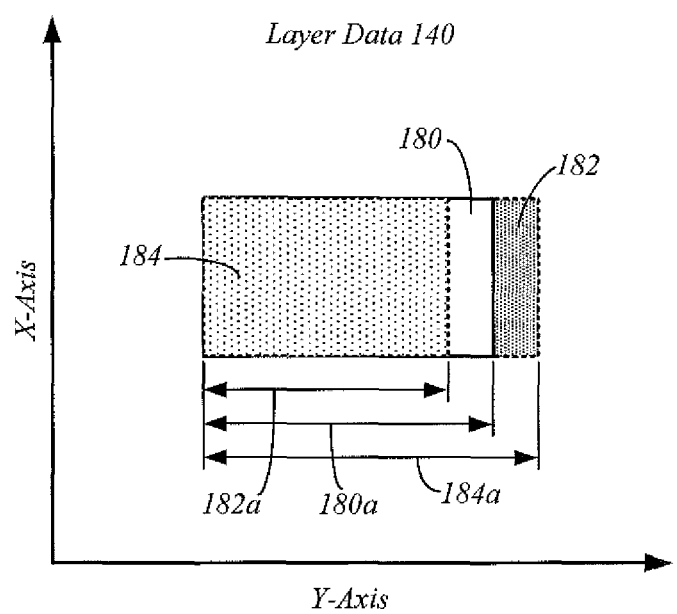
FIG. 10 is a graphical plot of an exemplary scanned image for detecting overlay errors, in accordance with embodiments of the present disclosure.

FIG. 10 illustrates an image 180 of a layer 22 or portion thereof represented by the layer data 140 generated by the imaging sensor 124. Elements 182 and 184 represent exemplary anticipated images of the layer 22 at the imaging sensor 124. Accordingly, the layer 22 represented by the image 180 has a magnification error in along the x-axis relative to the anticipated layers 22 represented by the images 182 and 184. In particular, the image 180 has a smaller surface area and smaller dimension in the x-direction relative to the image 182, and the image 180 has a magnification error in the form of a greater surface area and larger dimension in the x-direction relative to the image 184.

In some embodiments, the controller 36 compares one or more of the dimensions of the image 180 to the corresponding dimensions of the anticipated layer 22, such as that represented in the images 182 or 184. Thus, in some embodiments the controller 36 compares a length 180a in the x-direction of the image 180 to a length 182a or 184a in the x-direction of the exemplary anticipated images 182 and 184. The controller 36 calculates the magnification error in the x-direction as the difference between the length 180a and the length 182a or 182b. Such magnification errors may be corrected by the controller 36 by adjusting the tension in the belt 24 along the x-direction. Magnification errors in the x-y direction may be reduced or corrected by adjusting a temperature of the transfer belt, for example.

Using the layer data 140 and/or the part data 142, the controller 36 can compensate or correct the registration and overlay errors described above. For example, based on the layer data 140 and/or the part data 142 (as shown in FIGS. 7A and 7B), the controller 36 may compensate for the detected x-y registration errors between the EP engines 12 to reduce or eliminate the x-y registration errors for the successive layers 22. In some embodiments, the controller 36 updates calibration data for the EP engines 12 to adjust the printing of the layers 22 to compensate for at least some of the registration and overlay errors in the x-direction and/or the y-direction, and/or the skew errors. For example, in some embodiments, the controller 36 receives the scanned images from the detectors 131 of the imaging sensors 124 and/or 126, detects registration errors, and feeds the errors/corrections back to update the calibration data for the EP engines 12 to correct or reduce the registration errors between the EP engines for subsequently printed layers 22.

In some embodiments, the controller 36 compensates for overlay errors between the layers 22 and the intermediate build surface 88 by feeding the detected errors forward to the gantry 80, which adjusts the position of the build platform 28 in the x-y build plane within one-layer cycle to correct or reduce the overlay errors. In some embodiments, this compensation may be performed by updating calibration parameters of system 10. For instance, the controller 36 may update the servo coordinate data 146a and/or the x-axis coordinate data 146b to cause the gantry 80 to position the build platform 28 at the correct location in the x-y build plane during a printing operation based on the layer data 140 and/or the part data 142. This control may then be performed again for each layer 22, if desired, for continuous alignment updates. Alternatively, in some embodiments, the alignment update may be performed after given intervals to reduce processing demands on the controller 36.

For example, in order to compensate for the y-axis overlay errors between the leading edges 150a and 154a and between the trailing edges 150b and 154b (shown above in FIGS. 7A and 7B), the controller 36 may update the servo coordinate data 146a to modify the speed and timing sequence of the y-stage gantry 82 (via motor 85) based on the measured y-axis over lay errors (i.e., errors measured using the images from sensors 124 and 126) or predicted y-axis overlay errors (i.e., errors predicted based on the image from the sensor 124 and the belt speed). This modifies the movement speed and timing of the build platform 28, the x-stage gantry 84, and the structure 26 such that the leading edges 154a and the trailing edges 154b for the images 154 of the current or successive layers 22 shift to times t3 and t5 (corresponding to the y-axis locations of the leading edge 150a and the trailing edge 150b of the predicted image 150). In other words, this modification aligns the build surface 88 with the current or next successive layer 22 along the y-axis process direction of arrow 87a.

Additionally, in order to compensate for the x-axis overlay errors between the lateral edges 150c and 154d and between the lateral edges 150d and 154d (shown above in FIG. 6B), the controller 36 may update the x-axis coordinate data 146b to adjust the position of the build platform 28 along the lateral x-axis based on the measured x-axis overlay errors (i.e., errors measured using the images from sensors 124 and 126) or the predicted x-axis overlay errors (i.e., errors predicted based on the image from the sensor 124 and the belt speed). In particular, this causes the x-stage gantry 84 to move the build platform 28 and the structure 26 along the lateral x-axis (via motor 86). This repositions the build surface 88 of the structure 26 along the x-axis relative to the belt 24 such that the lateral edges 154c and 154d for the images 154 of the current or next successive layers 22 are positioned at locations x1 and x3 (corresponding to the x-axis locations of the lateral edges 150c and 150d of the predicted image 150).

The next successive layer 22 may then be transfused to the build surface 88 of the structure 26 with reduced or eliminated x-y overlay errors. As can be appreciated, the x-y adjustments to the build platform 28 need to be accomplished within one-layer cycle (i.e., before the next layer 22 is pressed at the nip roller 70). Otherwise, the movement of build platform 28 during the pressing at the nip roller 70 may reduce printing accuracies.

Figure 11:
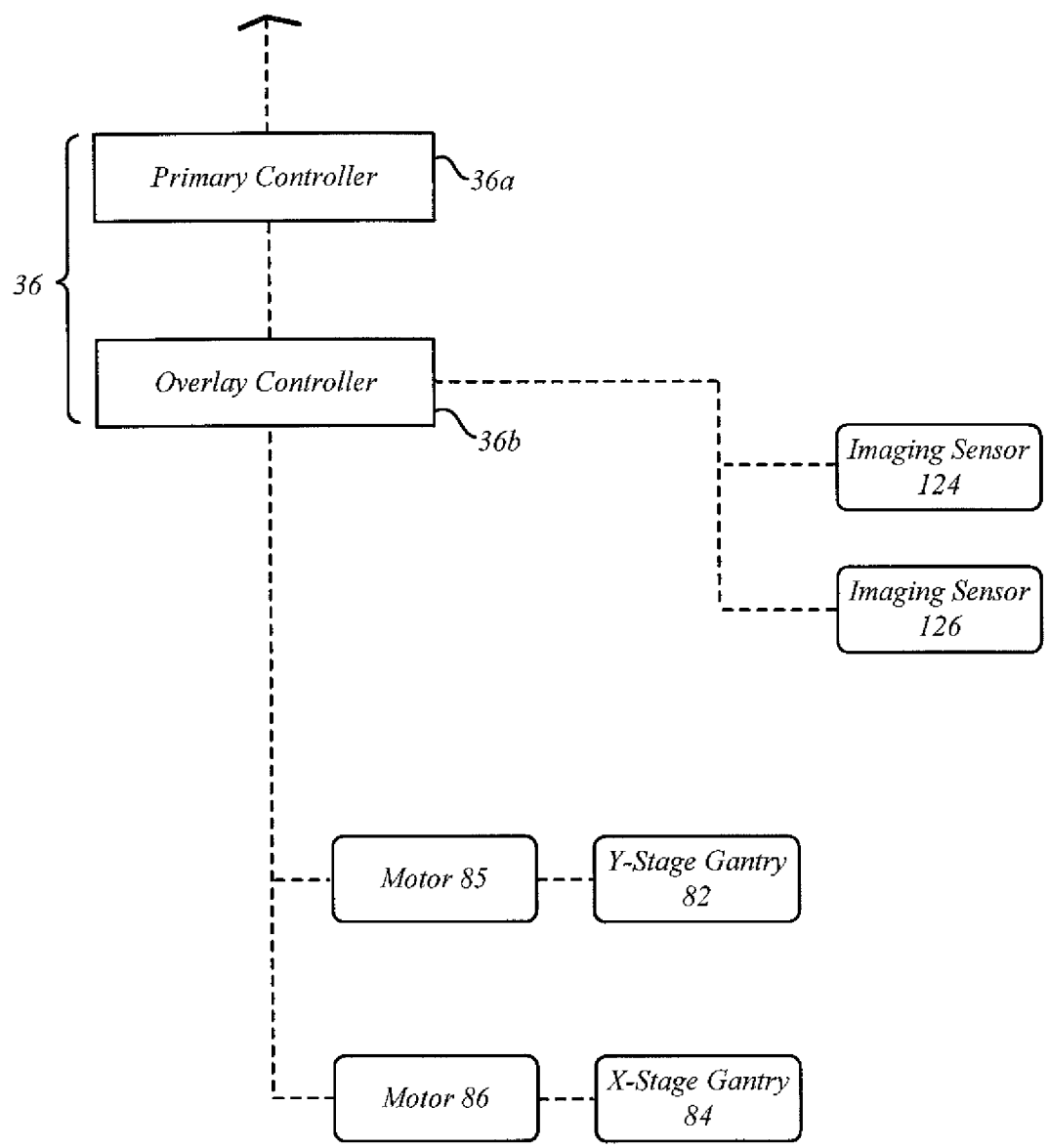
FIG. 11 is a schematic illustration of an alternative arrangement for the controller assembly of the system, in accordance with embodiments of the present disclosure.

As mentioned above, the controller 36 may include one or more computer-based systems configured to operate the components of system 10. FIG. 11 illustrates an embodiment in which the controller 36 includes a primary controller 36a and a secondary, overlay controller 36b. In this embodiment, overlay controller 36b may be installed as an independent and stand-alone controller to function with imaging sensors 124 and 126.

During operation, the controller 36a operates system 10 as discussed above, where the responsibility for generating the signals to the motor 85 of the y-stage gantry 82, and the motor 86 of the x-stage gantry 84 are passed either permanently or temporarily to the overlay controller 36b. In this case, the scanned images from imaging sensors 124 and 126 are transmitted to the overlay controller 36b, allowing the overlay controller 38b to compare the images to detect any x-y overlay errors.

If any x-y overlay error is detected, the overlay controller 36b may then commandeer one or both of the y-stage gantry 82 and the x-stage gantry 84 to reduce or eliminate the x-y overlay error for the next successive layer 22, as discussed above. After the realignment is made, the overlay controller 36b may then relinquish control of the y-stage gantry 82 to the controller 36a until a subsequent realignment is required. This embodiment is beneficial for use with an existing system 10, where the overlay controller 36b and imaging sensors 124, and 126 may be installed as an upgrade, for example, with minimal impact on the remaining components of the system 10.

Although the present disclosure has been described with reference to preferred embodiments, workers skilled in the art will recognize that changes may be made in form and detail without departing from the spirit and scope of the disclosure.

What is claimed is:

1. An additive manufacturing system for printing three-dimensional (3D) parts, the additive manufacturing system comprising:
   a first electrophotographic (EP) engine configured to develop layers of a first electrically charged powder material;
   a transfer medium configured to receive the developed layers from the first EP engine;
   a build platform;
   one or more gantry mechanisms configured to move the build platform;
   a pressing element configured to press the developed layers on the transfer medium into contact with intermediate build surfaces of a three-dimensional structure on the build platform in a layer-by-layer manner;
   a first sensor having a first output indicating a detected position of a developed layer on the transfer medium; and
   a controller configured to adjust the one or more gantry mechanisms to compensate for one or more overlay errors between the developed layer and the intermediate build surfaces, using the first output.

2. The system according to claim 1, wherein:
   the pressing element comprises a nip roller;
   the system comprises an encoder having an encoder output that is indicative of a rotational velocity of the nip roller; and
   the controller adjusts the one or more gantry mechanisms to compensate for the one or more overlay errors between the developed layer and the intermediate build surfaces using the encoder output.

3. The system according to claim 1, wherein the first sensor comprises an electromagnetic energy source, and electromagnetic energy discharged from the electromagnetic energy source is directed toward the transfer medium.

4. The system according to claim 3, wherein:
   the transfer medium comprises a belt; and
   the electromagnetic energy source has a wavelength to which the transfer belt is substantially opaque or transparent.

5. The system according to claim 4, wherein the electromagnetic energy source is configured to discharge electromagnetic energy having a wavelength selected from the group consisting of about 405 nm, about 635 nm, and about 300 nm-1000 nm.

6. The system according to claim 1, wherein the first sensor is located upstream from a pressing location of the pressing element along the transfer medium relative to a feed direction of the transfer medium.

7. The system according to claim 1, wherein:
   the transfer medium comprises a belt; and
   the first sensor is located along the belt greater than 4 inches from the pressing location of the pressing element.

8. The system according to claim 7, comprising a belt support roller positioned on an opposing side of the belt from the first sensor, wherein the belt support roller is displaced from the pressing element and is configured to support a portion of the belt that is sensed by the first sensor.

9. The system according to claim 1, wherein the first sensor is configured in one of brightfield illumination configuration and a darkfield illumination configuration.

10. The system according to claim 1, wherein:
    the system includes a second sensor having a second output indicating a location of the intermediate build surfaces; and
    the controller is configured to detect overlay errors, and adjust the one or more gantry mechanisms to reduce overlay errors using the second output.

11. The system according to claim 1, wherein:
    the overlay errors include a first-axis overlay error in a process direction of the moveable build platform, and a second-axis overlay error in a second direction that is perpendicular to the process direction of the moveable build platform; and
    the one or more gantry mechanisms comprise:
    a first gantry mechanism configured to move the build platform in the process direction; and a second gantry mechanism configured to move the build platform in the second direction.

12. The system according to claim 1, wherein:

the system includes a second electrophotographic (EP) engine configured to develop layers of a second electrically charged powder material on the transfer medium; and the controller is configured to reduce one or more registration errors between the first and second EP engines using the first output.

* * * * *